United States Patent
Honjo et al.

(10) Patent No.: US 8,159,542 B2
(45) Date of Patent: *Apr. 17, 2012

(54) INTERCHANGEABLE LENS, CAMERA SYSTEM, AND ITS CONTROL METHOD

(75) Inventors: Kenichi Honjo, Osaka (JP); Makoto Azuma, Tokushima (JP); Shigeo Sakaue, Osaka (JP)

(73) Assignee: Panasonic Corporation, Osaka (JP)

( * ) Notice: Subject to any disclaimer, the term of this patent is extended or adjusted under 35 U.S.C. 154(b) by 931 days.

This patent is subject to a terminal disclaimer.

(21) Appl. No.: 12/093,064

(22) PCT Filed: Nov. 9, 2006

(86) PCT No.: PCT/JP2006/322375
§ 371 (c)(1),
(2), (4) Date: May 8, 2008

(87) PCT Pub. No.: WO2007/055281
PCT Pub. Date: May 18, 2007

(65) Prior Publication Data
US 2009/0251548 A1 Oct. 8, 2009

(30) Foreign Application Priority Data

Nov. 11, 2005 (JP) .................................. 2005-327774

(51) Int. Cl.
*H04N 5/228* (2006.01)
(52) U.S. Cl. ................................ 348/208.4; 348/208.12
(58) Field of Classification Search .................... 396/55; 348/208.4, 208.11, 208.12
See application file for complete search history.

(56) References Cited

U.S. PATENT DOCUMENTS
5,337,098 A 8/1994 Imafuji et al.
(Continued)

FOREIGN PATENT DOCUMENTS
JP 3-100634 4/1991
(Continued)

*Primary Examiner* — Jason Chan
*Assistant Examiner* — Gary C Vieaux
(74) *Attorney, Agent, or Firm* — McDermott Will & Emery LLP

(57) ABSTRACT

To provide an interchangeable lens, a camera body, a camera system, and a method for controlling the same, with which a highly efficient and stable image blur correction effect can be obtained. A camera system (1) has a camera body (10) and an interchangeable lens (20) which is attachable to and detachable from the camera body (10). The camera body (10) has an imaging unit (120) for imaging a subject through the interchangeable lens (20), and a sequence microcomputer (100) capable of sending and receiving information to and from a lens microcomputer (200) and for controlling the imaging operation of an imaging unit (120). The interchangeable lens (20) includes a shake detection unit (201) for detecting shake in the camera system (1), an image blur correction device (210) for adjusting the optical path from a subject to the camera body (10) and thereby correcting the blurring of an image caused by shaking of the camera system (1), and the lens microcomputer (200) capable of sending and receiving information to and from the sequence microcomputer (100), and for controlling the drive of the image blur correction device (210) according to the amount of shake detected by the shake detection unit (201). The imaging optical system of the interchangeable lens (20) includes an aperture unit (206) which can adjust the imaging condition. The lens microcomputer (200) actuates the shake correction device (210) once a first set time has elapsed since the receipt of an adjustment command from the sequence microcomputer (100).

10 Claims, 14 Drawing Sheets

U.S. PATENT DOCUMENTS

| | | | |
|---|---|---|---|
| 5,416,554 A | 5/1995 | Hamada et al. | |
| 5,978,600 A * | 11/1999 | Takeuchi et al. | 396/53 |
| 6,704,501 B1 * | 3/2004 | Washisu | 396/55 |
| 7,424,213 B2 * | 9/2008 | Imada | 396/55 |
| 7,796,350 B2 * | 9/2010 | Yumiki et al. | 359/808 |
| 7,826,731 B2 * | 11/2010 | Yumiki et al. | 396/55 |
| 7,835,635 B2 * | 11/2010 | Honjo et al. | 396/55 |
| 2007/0003262 A1 * | 1/2007 | Shiratori | 396/55 |
| 2009/0244325 A1 * | 10/2009 | Honjo et al. | 348/231.99 |

FOREIGN PATENT DOCUMENTS

| | | |
|---|---|---|
| JP | 5-224270 | 9/1993 |
| JP | 05224270 A * | 9/1993 |
| JP | 7-159831 | 6/1995 |
| JP | 2000-98438 | 4/2000 |
| JP | 2000-330153 | 11/2000 |

* cited by examiner

INTERCHANGEABLE LENS, CAMERA SYSTEM, AND ITS CONTROL METHOD

RELATED APPLICATIONS

This application is the U.S. National Phase under 35 U.S.C. §371 of International Application No. PCT/JP2006/322375, filed on Nov. 9, 2006, which in turn claims the benefit of Japanese Application No. 2005-327774, filed on Nov. 11, 2005, the disclosures of which Applications are incorporated by reference herein.

TECHNICAL FIELD

The present invention relates to a camera system, and more particularly to a camera system equipped with a camera body and an interchangeable lens having an image blur correction function, and to a method for controlling this system.

BACKGROUND ART

Digital imaging devices, typified by digital cameras, have been rapidly growing in popularity in recent years. At the same time, the pixel count has been increasing in the CCDs, CMOSs, and other such imaging elements mounted in digital cameras. This reflects the desire for higher resolution in digital cameras. Therefore, single-reflex camera systems, compact digital cameras, high-magnification digital cameras, and the like have recently been equipped with an image blur correction function for correcting the blurring of images produced by camera shake.

Conventional single-reflex camera systems have had an interchangeable lens with a built-in image blur correction device and shake detection element, such as an angular velocity sensor or acceleration sensor. With these systems, the shake detection element detects when the camera is shaken, the image blur correction device computes a suitable correction value for the shake detected by the shake detection element, and the optical path is corrected by moving an image blur correction lens up, down, left, or right on the basis of this correction value. This suppresses the blurring of an image that would otherwise be produced by camera shake (see, for example, Patent Document 1).

Patent Document 1 proposes a continuous correction mode, in which image blur correction is performed when a release button is pressed half-way down, and a release correction mode, in which image blur correction is performed only during release, in view of reducing power consumption.
Patent Document 1: Japanese Laid-Open Patent Application H05-224270

DISCLOSURE OF INVENTION

A conventional image blur correction device is made up of an image blur correction optical system that allows for adjustment of the optical path from a subject to a camera body, and an image blur correction control unit for controlling the operation of the image blur correction optical system. Because the image blur correction optical system can only move within a limited range, during release the correction lens is preferably located near the middle of the movable range.

However, in the continuous correction mode, for example, there is a high likelihood that the correction lens will deviate significantly from the movable range by the time of release. Accordingly, during release when a correction effect is actually needed, there is the risk that the correction width of the image blur correction device will be too small and an adequate image blur correction effect will not be obtained. Also, in this case, since the drive time of the image blur correction device is longer than necessary, more power is consumed, which is inefficient.

Also, with a conventional image blur correction device, the specified image blur correction effect is not obtained immediately upon actuation. More specifically, for a short time after the image blur correction device is actuated, the effects of the control system such as the image blur correction control unit, and the inertial moment of the image blur correction optical system produce a lag in the operation of the image blur correction optical system with respect to the designated correction amount. Consequently, for a while after actuation, the absolute amount of correction error is large, and the specified image blur correction effect is not obtained. As a result, in the release correction mode, the above-mentioned correction error of the image blur correction device prevents the correction effect of the image blur correction device from being obtained for at least part of the time during release.

Thus, the timing at which the image blur correction device is actuated is extremely important from the standpoint of the correction effect, but no camera system has yet been proposed with which the image blur correction device can be actuated at the proper timing.

Furthermore, with a conventional camera system, the user has no way of ascertaining that an image has been captured without the image blur correction device providing an adequate image blur correction effect. Consequently, either the user does not notice that an adequate image blur correction effect has not been obtained, or the user must confirm every time that a satisfactory image has been captured, and either case is undesirable.

It is an object of the present invention to provide an interchangeable lens, a camera body, a camera system, and a method for controlling the same, with which a highly efficient and stable image blur correction effect can be obtained.

It is another object of the present invention to provide a camera body, a camera system, and a method for controlling the same, with which the user can ascertain whether or not an adequate image blur correction effect has been obtained.

The camera system according to a first aspect of the present invention is a camera system for imaging a subject, and includes a camera body, and an interchangeable lens which is attachable to and detachable from the camera body. The camera body includes an imaging unit for imaging the subject, and a body control unit for controlling the operation of the imaging unit. The interchangeable lens includes a shake detection unit for detecting shake in the camera system, an image blur correction unit for adjusting the optical path from the subject to the camera body and thereby correcting the blurring of an image caused by shaking of the camera system, a lens control unit for controlling the drive of the image blur correction unit according to the amount of shake detected by the shake detection unit, and an imaging optical system conducting the optical image of the subject to the imaging unit. The body control unit is capable of sending and receiving information to and from the lens control unit. The imaging optical system includes a condition adjustment unit which can adjust an imaging condition. The lens control unit starts an adjustment operation in the condition adjustment unit based on an adjustment command sent from the body control unit for adjusting the imaging condition, and actuates the image blur correction unit once a first set time has elapsed since the receipt of the adjustment command.

With this camera system, once a first set time has elapsed since the receipt of the adjustment command from the body control unit, the lens control unit actuates the image blur correction unit. Therefore, by adjusting the length of the first set time, it is possible to adjust the timing at which the image blur correction unit is actuated so that the correction operation of the image blur correction unit stabilizes simultaneously with or just prior to when the adjustment of the imaging condition ends and the exposure preparation is complete.

As a result, with this camera system, it is possible to prevent a reduce in the range of correction and an increase in the consuming electricity during exposure due to the actuation of the image blur correction unit being early, and it is possible to prevent the image blur correction effect from deteriorating during exposure due to the actuation of the image blur correction unit being late. In other words, with this camera system, a highly efficient and stable image blur correction effect can be obtained.

Here, "adjustment command" is a command other than an actuation command of the image blur correction unit, and it is a command that the camera body sends to the interchangeable lens simultaneously with or before it starts the exposure preparation. In addition, the "condition alteration unit" includes an aperture adjustment unit that adjusts an aperture, a focus adjustment unit that adjusts the focus, a zoom adjustment unit that adjusts the zoom, and the like. In addition, "exposure preparation" means a series of operations transitioning from a state in which the image of a subject can be confirmed to a state in which exposure can be performed. In the case of a single-reflex camera system, for instance, an example of this is a return mirror up operation after a release button has been pushed all the way down. In addition, the "first set time" includes zero.

The camera system according to a second aspect of the present invention is the camera system of the first aspect, wherein the condition adjustment unit includes an aperture adjustment unit which can adjust an aperture in the imaging optical system. The body control unit sends the adjustment command almost simultaneously with the start of the exposure preparation. The lens control unit starts an adjustment operation in the aperture adjustment unit based on the adjustment command.

In this case, the command for adjusting the aperture that is started simultaneously with the exposure preparation of the camera body can be used as the actuation command of the image blur correction unit. Therefore, an actuation command for the image blur correction unit sent from the camera body to the interchangeable lens is not needed, and it is possible to simplify the system.

Here, "almost simultaneously" also includes the case that the timing is slightly off due to the different communication speed in each unit, other than the case that the start of the exposure preparation and the transmission of the adjustment command are completely at the same time.

The camera system according to a third aspect of the present invention is the camera system of the second aspect, wherein the body control unit sends the required exposure preparation time from the start of the exposure preparation until the completion thereof in the camera body to the lens control unit, prior to sending the adjustment command. The lens control unit determines the first set time based on the exposure preparation time and a required correction stabilization time from the actuation of the image blur correction unit until a predetermined image blur correction effect is obtained.

In this case, the first set time is determined based on the exposure preparation time and the correction stabilization time. Therefore, the timing at which the image blur correction unit is actuated can be adjusted so that the correction operation of the image blur correction unit stabilizes almost simultaneously with the completion of the exposure preparation.

Here, the "predetermined image blur correction effect is obtained" means the amount of blurring of an image after correction is at or below a predetermined permissible value, as a result of being corrected by the image blur correction unit.

The camera system according to a fourth aspect of the present invention is the camera system according to the second aspect, wherein the first set time is set in advance in the lens control unit.

In this case, it is not necessary to send information used for determining the first set time from the camera body to the interchangeable lens. Therefore, with this camera system, it is possible to further simplify the system. This camera system is effective especially if the exposure preparation time practically does not change due to the model of the camera body.

The camera system according to a fifth aspect of the present invention is the camera system of the fourth aspect, wherein the first set time is zero. The lens control unit actuates the image blur correction unit almost simultaneously with the time that the adjustment operation of the aperture adjustment unit is started, based on the adjustment command.

This camera system is effective, especially if the lengths of the exposure preparation time and the correction stabilization time are approximately the same.

Here, "almost simultaneously" also includes the case that the timing is slightly off due to the different communication speed in each unit, other than the case that the start of the adjustment operation and the actuation of the image blur correction unit are completely at the same time.

The camera system according to a sixth aspect of the present invention is the camera system of the first aspect, wherein the condition adjustment unit includes a focus adjustment unit which can adjust the focus position of the imaging optical system. The lens control unit starts an adjustment operation in the focus adjustment unit based on the adjustment command.

In this case, the command for adjusting the aperture that is started simultaneously with the exposure preparation of the camera body can be used as an actuation command for the image blur correction unit. Therefore, an actuation command for the image blur correction unit sent from the camera body to the interchangeable lens is not needed, and it is possible to simplify the system. This camera system is effective, especially if the adjustment of the focus position and the exposure preparation are performed continuously. Here, "the adjustment of the focus position" include, for example, the adjustment of the focus, the adjustment of the zoom (adjustment of zoom magnifying power), and the like.

The camera system according to a seventh aspect of the present invention is the camera system of the sixth aspect, wherein the body control unit sends a second set time from the start of the adjustment operation of the condition adjustment unit until the completion of the exposure preparation to the lens control unit, prior to sending the adjustment command. The lens control unit determines the first set time based on the second set time and a required correction stabilization time from the actuation of the image blur correction unit until a predetermined image blur correction effect is obtained.

In this case, the first set time is determined based on the second set time and the correction stabilization time. Therefore, the timing at which the image blur correction unit is actuated can be adjusted so that the correction operation of the image blur correction unit stabilizes almost simultaneously with the completion of the exposure preparation.

The camera system according to an eighth aspect of the present invention is the camera system according to the third aspect, wherein the camera body further includes an information display unit for displaying information related to the camera body. The body control unit includes a time counting unit for performing a time count from the point when the adjustment command is sent to the lens control unit until the exposure of the imaging unit is begun, and a warning unit for displaying a warning on the information display unit if the time count in the time counting unit is shorter than the exposure preparation time.

If the actual exposure preparation time is shorter than the exposure preparation time that is set, there is the possibility that exposure may start in a state that the correction operation of the image blur correction unit is not completely stabilized. Here, by performing a warning display when the actual exposure preparation time is short, it is possible to make the user recognize that a sufficient image blur correction effect has not been obtained.

The camera system according to a ninth aspect of the present invention is the camera system of the seventh aspect, wherein the camera body further includes an information display unit for displaying information related to the camera body. The body control unit includes a time counting unit for performing a time count from the point when the adjustment command is sent to the lens control unit until the exposure of the imaging unit is begun, and a warning unit for displaying a warning on the information display unit if the time count in the time counting unit is shorter than the second set time.

If the actual operation time corresponding to the second set time is shorter than the second set time, there is the possibility that exposure may start in a state that the correction operation of the image blur correction unit is not completely stabilized. Here, by performing a warning display when the actual operation time is short, it is possible to make the user recognize that a sufficient image blur correction effect has not been obtained.

The interchangeable lens according to a tenth aspect of the present invention is used in a camera system for imaging a subject and is attachable to and detachable from a camera body. The camera body includes an imaging unit for imaging the subject, and a body control unit for controlling the imaging operation of the imaging unit. This interchangeable lens includes a shake detection unit, an image blur correction unit, a lens control unit, and an imaging optical system. The shake detection unit detects shake in the camera system. The image blur correction unit adjusts the optical path from the subject to the camera body and thereby corrects the blurring of an image caused by shaking of the camera system. The lens control unit controls the drive of the image blur correction unit according to the amount of shake detected by the shake detection unit. The imaging optical system leads the optical image of the subject to the imaging unit. The lens control unit is capable of sending and receiving information to and from the body control unit. The imaging optical system includes a condition adjustment unit which can adjust an imaging condition. The lens control unit starts an adjustment operation in the condition adjustment unit based on an adjustment command sent from the body control unit for adjusting the imaging condition, and actuates the image blur correction unit once a first set time has elapsed since the receipt of the adjustment command.

In this interchangeable lens, the lens control unit actuates the image blur correction unit once the first set time has elapsed since the receipt of the adjustment command from the body control unit. Therefore, by adjusting the length of the first set time, the timing at which the image blur correction unit is actuated can be adjusted so that the correction operation of the image blur correction unit stabilizes simultaneously with, or just prior to, when the adjustment of the imaging condition ends and the exposure preparation is complete.

As a result, in this interchangeable lens, it is possible to prevent a reduce in the range of correction and an increase in the consuming electricity during exposure due to the actuation of the image blur correction unit being early, and it is possible to prevent the image blur correction effect from deteriorating during exposure due to the actuation of the image blur correction unit being late. In other words, in this interchangeable lens, a highly efficient and stable image blur correction effect can be obtained.

Here, "adjustment command" is a command other than an actuation command of the image blur correction unit, and it is a command that the camera body sends to the interchangeable lens simultaneously with or before it starts the exposure preparation. In addition, the "condition alteration unit" includes an aperture adjustment unit that adjusts an aperture, a focus adjustment unit that adjusts the focus, a zoom adjustment unit that adjusts the zoom, and the like. In addition, "exposure preparation" means a series of operations transitioning from a state in which the image of a subject can be confirmed to a state in which exposure can be performed. In the case of a single-reflex camera system, for instance, an example of this is a return mirror up operation after a release button has been pushed all the way down. In addition, the "first set time" includes zero.

The method for controlling a camera system according to an eleventh aspect of the present invention is a method for controlling a camera system including a camera body, and an interchangeable lens which is attachable to and detachable from the camera body. The camera body includes an imaging unit for imaging a subject, and a body control unit for controlling the operation of the imaging unit. The interchangeable lens includes a shake detection unit for detecting shake in the camera system, an image blur correction unit for adjusting the optical path from the subject to the camera body and thereby correcting the blurring of an image caused by shaking of the camera system, a lens control unit for controlling the drive of the image blur correction unit according to the amount of shake detected by the shake detection unit, and an imaging optical system for leading the optical image of the subject to the imaging unit. This controlling method includes a process in which the imaging condition is adjusted by a condition adjustment unit which can adjust the imaging condition of the imaging optical system, based on an adjustment command from the body control unit, and a process in which the image blur correction unit is actuated once a first set time has elapsed since the lens control unit received the adjustment command.

In this controlling method, the image blur correction unit is actuated once a first set time has elapsed since the receipt of the adjustment command from the body control unit. Therefore, by adjusting the length of the first set time, it is possible to adjust the timing at which the image blur correction unit is actuated so that the correction operation of the image blur correction unit stabilizes simultaneously with or just prior to when the adjustment of the imaging condition ends and the exposure preparation is complete.

Here, "adjustment command" is a command other than an actuation command of the image blur correction unit, and it is a command that the camera body sends to the interchangeable lens simultaneously with or before it starts the exposure preparation. In addition, the "condition alteration unit" includes an aperture adjustment unit that adjusts an aperture, a focus adjustment unit that adjusts the focus, a zoom adjustment unit that adjusts the zoom, and the like. In addition, "exposure preparation" means a series of operations transitioning from a state in which the image of a subject can be confirmed to a state in which exposure can be performed. In the case of a single-reflex camera system, for instance, an example of this is a return mirror up operation after a release button has been pushed all the way down. In addition, the "first set time" includes zero.

| EXPLANATION OF REFERENCE | |
|---|---|
| 1 | camera system |
| 10 | camera body |
| 20 | interchangeable lens |
| 100 | sequence microcomputer (body control unit) |
| 101 | digital processing microcomputer |
| 102 | external memory |
| 103 | mechanical control unit |
| 104 | focal point detection unit |
| 105 | liquid crystal unit for image display |
| 106 | imaging sensor |
| 107 | shutter |
| 108 | sub-mirror |
| 109 | main mirror |
| 110 | reticle |
| 111 | pentaprism |
| 112 | eyepiece |
| 113 | imaging sensor drive unit |
| 120 | imaging unit |
| 130 | finder unit |

| -continued | |
|---|---|
| EXPLANATION OF REFERENCE | |
| 200 | lens microcomputer (lens control unit) |
| 201 | shake detection unit |
| 202 | image blur correction control unit |
| 203 | focus control unit |
| 204 | aperture drive unit |
| 205 | focusing lens |
| 206 | aperture unit |
| 207 | image blur correction lens unit |
| 210 | image blur correction device (image blur correction unit) |
| S1 | first switch |
| S2 | second switch |
| SMODE | image blur correction mode selector switch |

BEST MODE FOR CARRYING OUT THE INVENTION

Embodiments of the present invention will now be described with reference to the appended drawings.

First Embodiment

1: Overall Structure of Camera System

Figure 1:
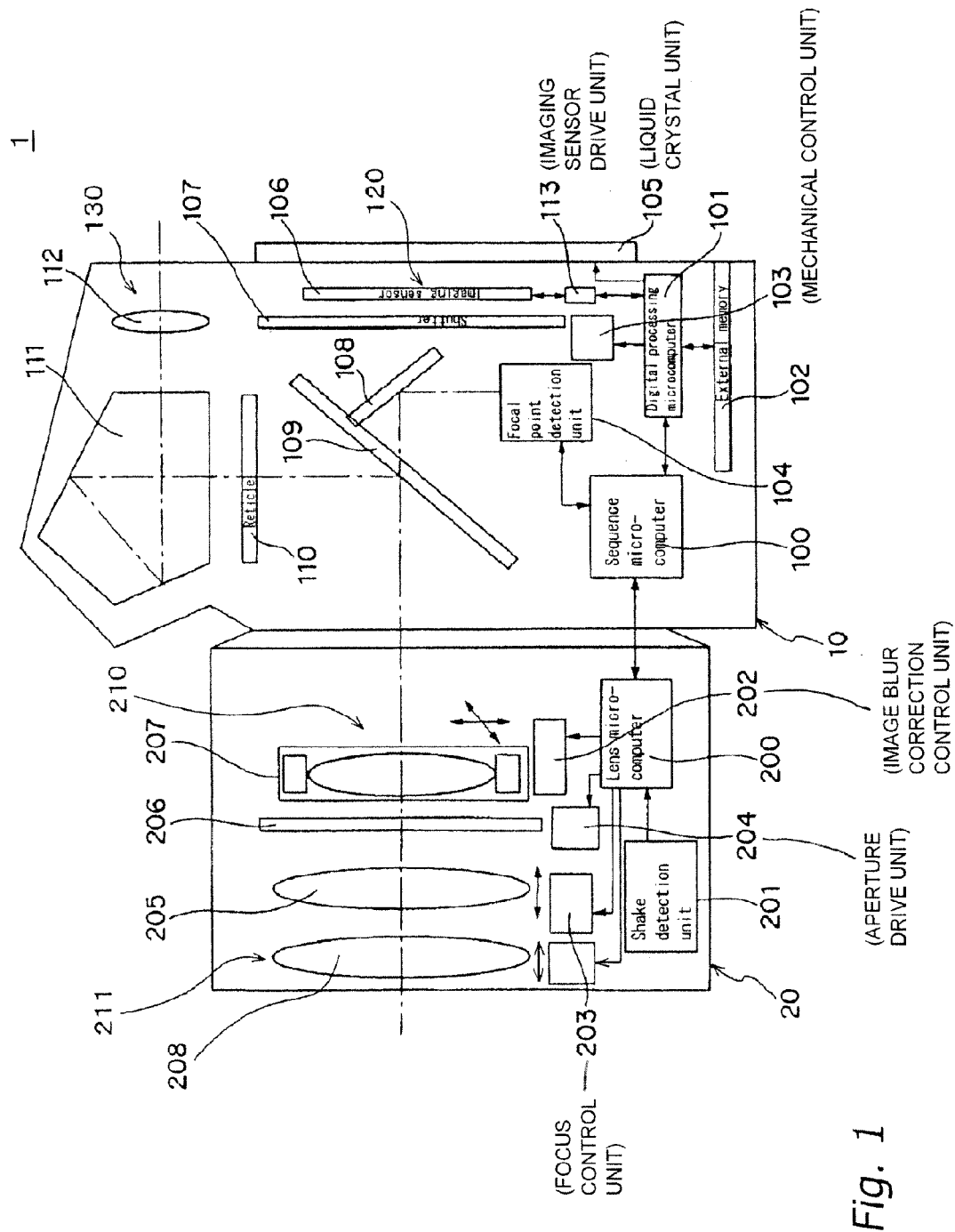
FIG. 1 is a diagram of the overall structure of a single-reflex camera system in a first embodiment of the present invention.

The overall structure of a single-reflex camera system 1 according to a first embodiment of the present invention will be described with reference to FIGS. 1 to 3. FIG. 1 is a diagram of the overall structure of the single-reflex camera system 1 as the camera system according to the first embodiment of the present invention, FIG. 2 is a block diagram of the single-reflex camera system 1 shown in FIG. 1, and FIG. 3 is an oblique view of an interchangeable lens.

Figure 2:
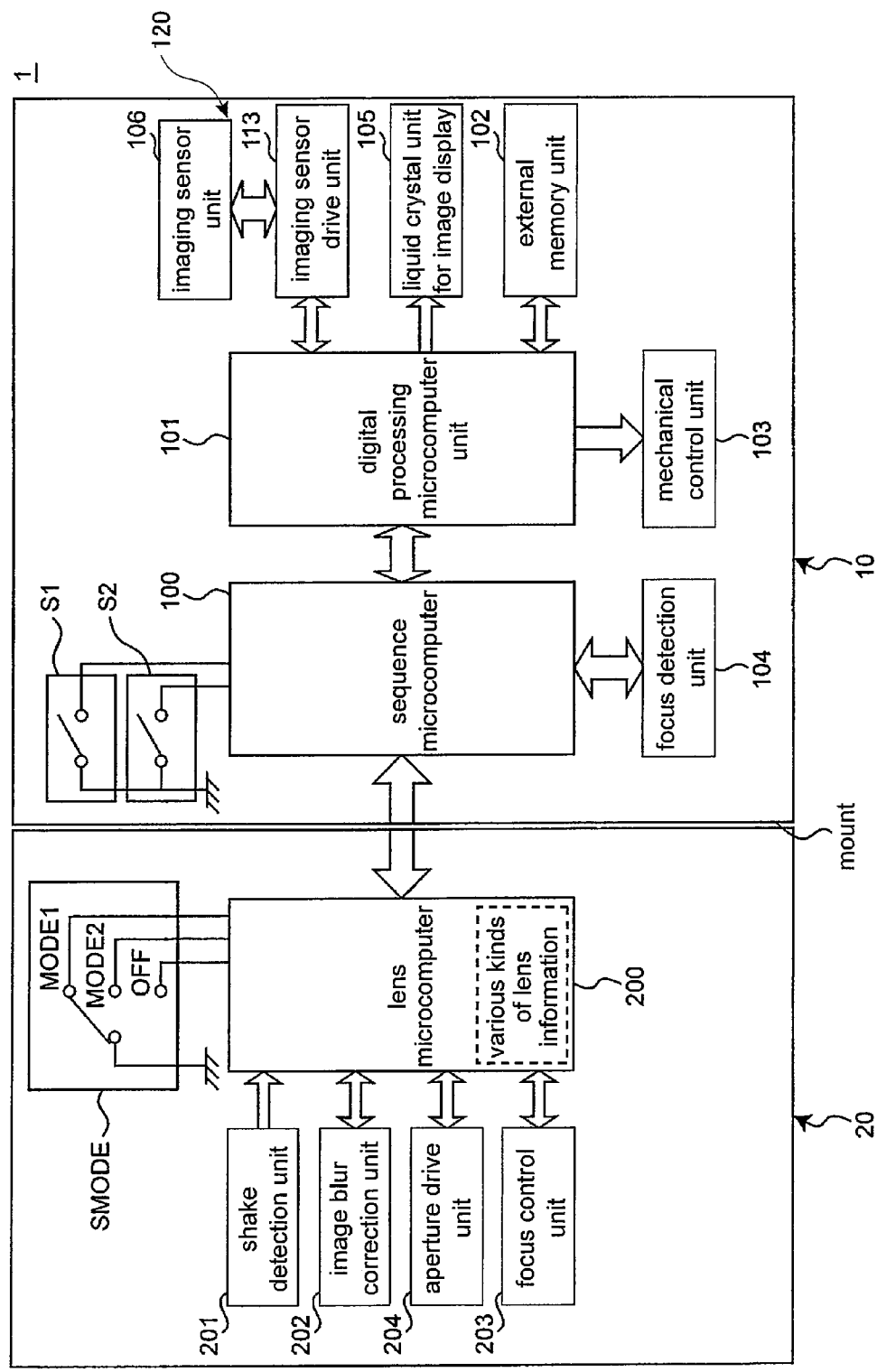
FIG. 2 is a block diagram of a camera unit and an interchangeable lens in the first embodiment of the present invention.
Figure 3:
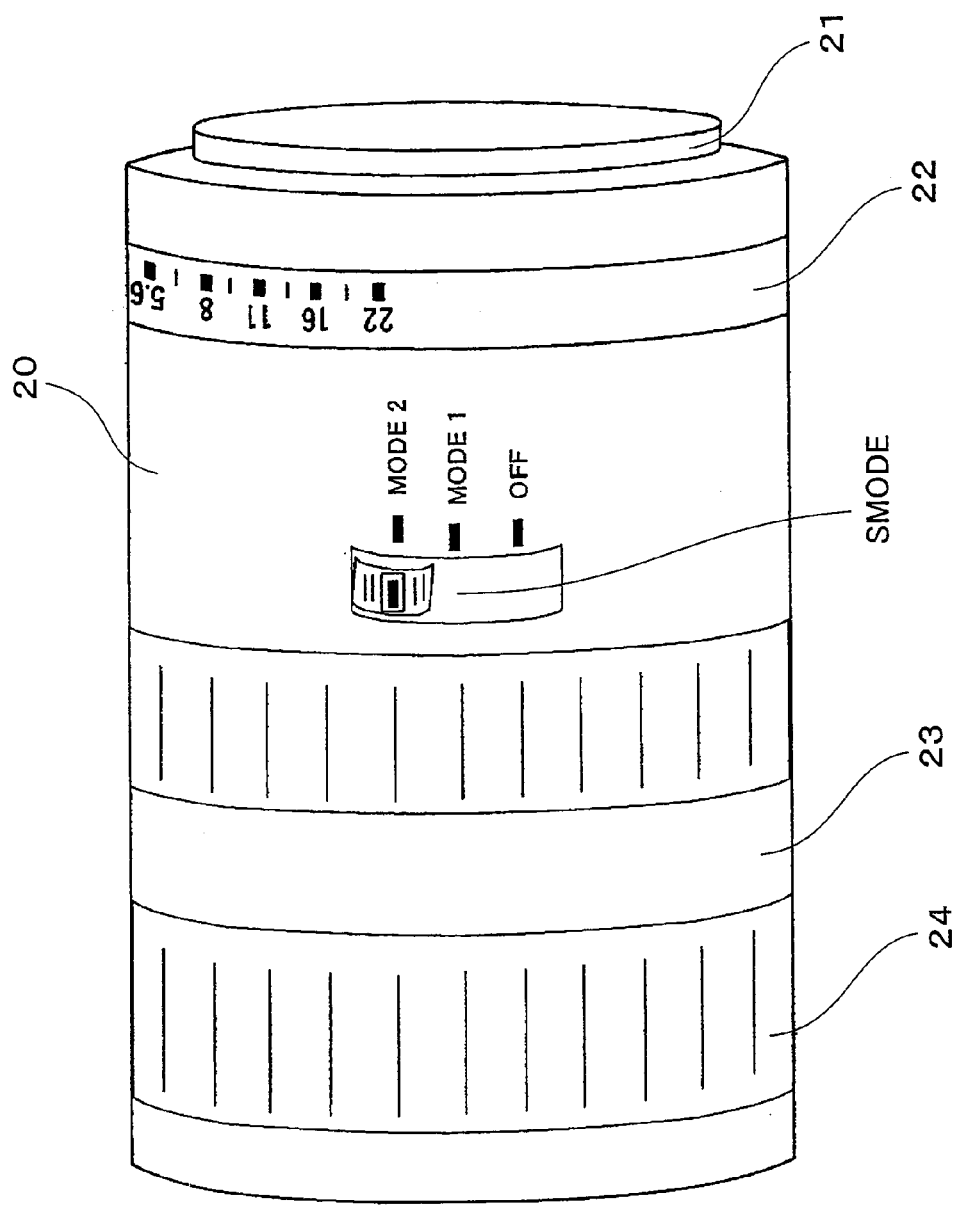
FIG. 3 is an oblique view of the interchangeable lens in the first embodiment of the present invention.

As shown in FIGS. 1 and 2, the single-reflex camera system 1 is mainly made up of a camera body 10 having the main functions of the camera system 1, and an interchangeable lens 20 that can be attached to and detached from the camera body 10.

1.1: Camera Body

The camera body 10 is mainly made up of an imaging unit 120 for imaging a subject, a sequence microcomputer 100 serving as a body control unit for controlling the operation of the imaging unit 120, an image display liquid crystal unit 105 serving as an information display unit for displaying captured images and various kinds of information, an external memory 102 serving as an interface with a medium for recording image data, and a finder unit 130 for viewing a subject image.

The imaging unit 120 is mainly made up of a main mirror 109 capable of reflecting and transmitting incident light, a sub-mirror 108 for reflecting light transmitted by the main mirror 109, an imaging sensor 106 such as a CCD for performing opto-electrical conversion, a shutter 107 for adjusting the exposure state of the imaging sensor 106, a mechanical control unit 103 for controlling the drive of the sub-mirror 108, the main mirror 109, and the shutter 107, an imaging sensor drive unit 113 for driving the imaging sensor 106, a digital processing microcomputer 101 for controlling the operation of the various components of the imaging unit 120, and a focal point detection unit 104 for detecting a focal point (focused on a subject image). The focal point detection unit 104 performs focal point detection by a standard phase difference detection method, for example.

The digital processing microcomputer 101 is connected to the external memory 102, the image display liquid crystal unit 105, the mechanical control unit 103, and the imaging sensor drive unit 113, and controls the operations of the various components. The sequence microcomputer 100 is connected to the digital processing microcomputer 101 and the focal point detection unit 104, and controls the operation of the digital processing microcomputer 101 and the focal point detection unit 104. The sequence microcomputer 100 has a body information storage unit (not shown) that stores various kinds of information (body information) related to the camera body 10.

The finder unit 130 is made up of a reticle 110 on which a subject image is formed, a pentaprism 111 for converting the subject image into an erecting image, and an eyepiece 112 through which the user views an erecting image of the subject.

Also, as shown in FIG. 2, the camera body 10 is provided with a release button (not shown), a first switch S1 that is connected to the release button and operates when the release button is pressed half-way down, and a second switch S2 that is connected to the release button and operates when the release button is pressed all the way down. That is, the first switch S1 is ON when the release button has been pressed half-way down, and the first switch S1 and second switch S2 are both ON when the release button has been pressed all the way down. When the release button is pressed half-way down and the first switch S1 is ON, power is supplied to the various components, starting with the sequence microcomputer 100, the digital processing microcomputer 101, and a lens microcomputer 200.

1.2: Interchangeable Lens

The interchangeable lens 20 is mainly made up of a focusing lens 205, a focus control unit 203 for controlling the operation of the focusing lens 205, an aperture unit 206, an aperture drive unit 204 for controlling the operation of the aperture unit 206, a shake detection unit 201 for detecting the amount of shake in the camera system 1, an image blur correction device 210 serving as an image blur correction unit for correcting the blurring of an image produced by shaking of the camera system 1, and the lens microcomputer 200 serving as a lens control unit for controlling the operation of various components. The lens microcomputer 200 also has a lens information storage unit (not shown) for storing various kinds of lens information (described below). The image blur correction device 210 is made up of an image blur correction lens unit 207 capable of adjusting the optical path, and an image blur correction control unit 202 for controlling the operation of the image blur correction lens unit 207. The lens information storage unit is preferably a nonvolatile recording medium. The lens information storage unit may also be mounted outside of the lens microcomputer 200.

As shown in FIG. 3, the interchangeable lens 20 has a lens mount 21 installed on the camera body 10 side, an aperture setting ring 22 for manually setting the aperture, an image blur correction mode selector switch SMODE for switching the image blur correction mode, a focusing ring 23 for focusing manually, and a zoom ring 24 for setting the zoom manually.

When the interchangeable lens 20 has been mounted on the camera body 10, the sequence microcomputer 100 and the lens microcomputer 200 are connected via electrical contacts on mounts (not shown) on the lens mount 21 and the camera body 10 side. This allows information to be sent back and forth between the lens microcomputer 200 and the sequence microcomputer 100.

Also, as shown in FIG. 3, the image blur correction mode selector switch SMODE is made up of a three-position sliding selector switch. Here, "MODE 1" is a "continuous correction mode" in which image blur correction is performed when the release button is pressed half-way down, while "MODE 2" is a "release correction mode," in which image blur correction is performed only during release ("during release" means that the release button is pressed all the way down), and "OFF" is a mode in which image blur correction is not performed. The user selects one of these modes by using the image blur correction mode selector switch SMODE.

Furthermore, the interchangeable lens 20 includes a zoom adjustment unit 211 that is capable of adjusting the zoom. The zoom adjustment unit 211 is operated by a zoom operating unit (not shown) that is arranged on the zoom ring 24 of the interchangeable lens 20 or the camera body 10. More specifically, the zoom adjustment unit 211 drives a zoom lens group 208 in the optical axis direction, so that the state of the zoom becomes the instructed value of the operation unit from the lens microcomputer 200.

In addition, for example, the focusing lens 205 and the focus control unit 203, the aperture unit 206 and the aperture drive unit 204, and the zoom adjustment unit 211 correspond to a condition alteration unit. In addition, the focusing lens 205, the aperture unit 206, and the zoom lens group 208 correspond to the driven members of the condition alteration unit.

2: Operation of Camera System

The operation of the camera system 1 will be described with reference to FIGS. 1 to 8.

2.1: Operation Before Imaging

As shown in FIG. 1, the light from a subject (not shown) is transmitted through the interchangeable lens 20 and is incident on the main mirror 109, which is a semi-transmitting mirror. Part of the light incident on the main mirror 109 is reflected and is incident on the reticle 110, and the rest of the light is transmitted and incident on the sub-mirror 108. The light incident on the reticle 110 forms a subject image. This subject image is converted by the pentaprism 111 into an erecting image and is incident on the eyepiece 112. This allows the user to see an erecting image of the subject through the pentaprism 111 and the eyepiece 112. Meanwhile, the light incident on the sub-mirror 108 is reflected and is incident on the focal point detection unit 104.

2.2: Operation During Imaging

When the release button is pressed half-way down by the user, the first switch S1 enters its ON state. As a result, power is supplied to the sequence microcomputer 100 and the lens microcomputer 200, and the sequence microcomputer 100 and lens microcomputer 200 are actuated. The sequence microcomputer 100 and lens microcomputer 200 are programmed to exchange information with each other upon actuation. For example, body information related to the camera body 10 is sent from the sequence microcomputer 100 to the lens microcomputer 200, and this body information is held in the lens microcomputer 200. Also, lens information related to the interchangeable lens 20 is sent from the lens microcomputer 200 to the sequence microcomputer 100, and this lens information is held in the sequence microcomputer 100. The sequence microcomputer 100 examines the received lens information. If the sequence microcomputer 100 determines that the interchangeable lens 20 is equipped with an image blur correction function, then the sequence microcomputer 100 sends to the lens microcomputer 200 a command to operate the shake detection unit 201 and a command to operate the image blur correction control unit 202.

A case in which MODE 1 is selected with the image blur correction mode selector switch SMODE will be described here as an example. When MODE 1 is selected with the image blur correction mode selector switch SMODE, a defocus amount (hereinafter "Df amount") from the focal point detection unit 104 is outputted from the sequence microcomputer 100 to the sequence microcomputer 100, and the sequence microcomputer 100 sends the lens microcomputer 200 a command to drive the focusing lens 205 by the Df amount. Upon receiving the command, the lens microcomputer 200 controls the focus control unit 203 to drive the focusing lens 205 by the Df amount. The detected Df amount is steadily decreased by repeatedly detecting the focal point and driving the focusing lens 205. The sequence microcomputer 100 determines that a focused state has been attained at the point when the detected Df amount is at or below a specific level, and sends the lens microcomputer 200 a command to halt the drive of the focusing lens 205.

After a focused state has been attained, the sequence microcomputer 100 stands by until the second switch S2 changes to its ON state. As mentioned above, the second switch S2 is a switch that enters its ON state when the release button has been pressed all the way down. When the second switch S2 enters its ON state, the sequence microcomputer 100 sends the lens microcomputer 200 an aperture value calculated on the basis of the output from a photometric sensor (not shown) included in the camera system 1. After receiving the aperture value, the lens microcomputer 200 closes (or opens) the aperture unit 206 via the aperture drive unit 204 until the received aperture value matches the aperture value of the aperture unit 206. The sequence microcomputer 100 sends the digital processing microcomputer 101 a command to initiate the release sequence simultaneously with the indication of the aperture value.

After receiving a command to initiate the release sequence, the digital processing microcomputer 101 first uses the mechanical control unit 103 to retract the sub-mirror 108 and the main mirror 109 from within the optical path. Once this retraction is complete, the digital processing microcomputer 101 sends the imaging sensor drive unit 113 a command to drive the imaging sensor 106, and then sends the mechanical control unit 103 a command to operate the shutter 107. The mechanical control unit 103 exposes the imaging sensor 106 for the length of time indicated by the shutter speed, which is calculated on the basis of the output from the photometric sensor (not shown). Exposure may also be executed by sending a command to the imaging sensor drive unit 113 such that the imaging sensor 106 will carry out a charge accumulation time that matches the time indicated by the shutter speed.

Upon completion of exposure, the digital processing microcomputer 101 reads image data from the imaging sensor 106 via the imaging sensor drive unit 113, and after specific image processing, controls the image display liquid crystal unit 105 such that the captured image is displayed, and writes image data to a storage medium via the external memory 102.

Also, the digital processing microcomputer 101 notifies the sequence microcomputer 100 of the completion of exposure and commands the mechanical control unit 103 to reset the plurality of mirrors 108 and 109 and the shutter 107 to their initial positions at the same time.

The sequence microcomputer 100 commands the lens microcomputer 200 to return the lens position of the image blur correction lens unit 207 to a reference position (center), and to reset the aperture of the aperture unit 206 to an open position, and the lens microcomputer 200 sends a reset command to the image blur correction control unit 202 and the aperture drive unit 204.

Upon completion of resetting, the lens microcomputer 200 notifies the sequence microcomputer 100 that resetting has been completed. The sequence microcomputer 100 waits for reset completion information from the lens microcomputer 200 and completion information for the series of processing after exposure by the digital processing microcomputer 101. Once both sets of information have been received, the sequence microcomputer 100 confirms that the release button has not been pressed, that is, that the first switch S1 and the second switch S2 are both in their OFF state. If the first switch S1 and the second switch S2 are both in their OFF state, the imaging sequence is ended.

2.3: Time Chart

Figure 4:
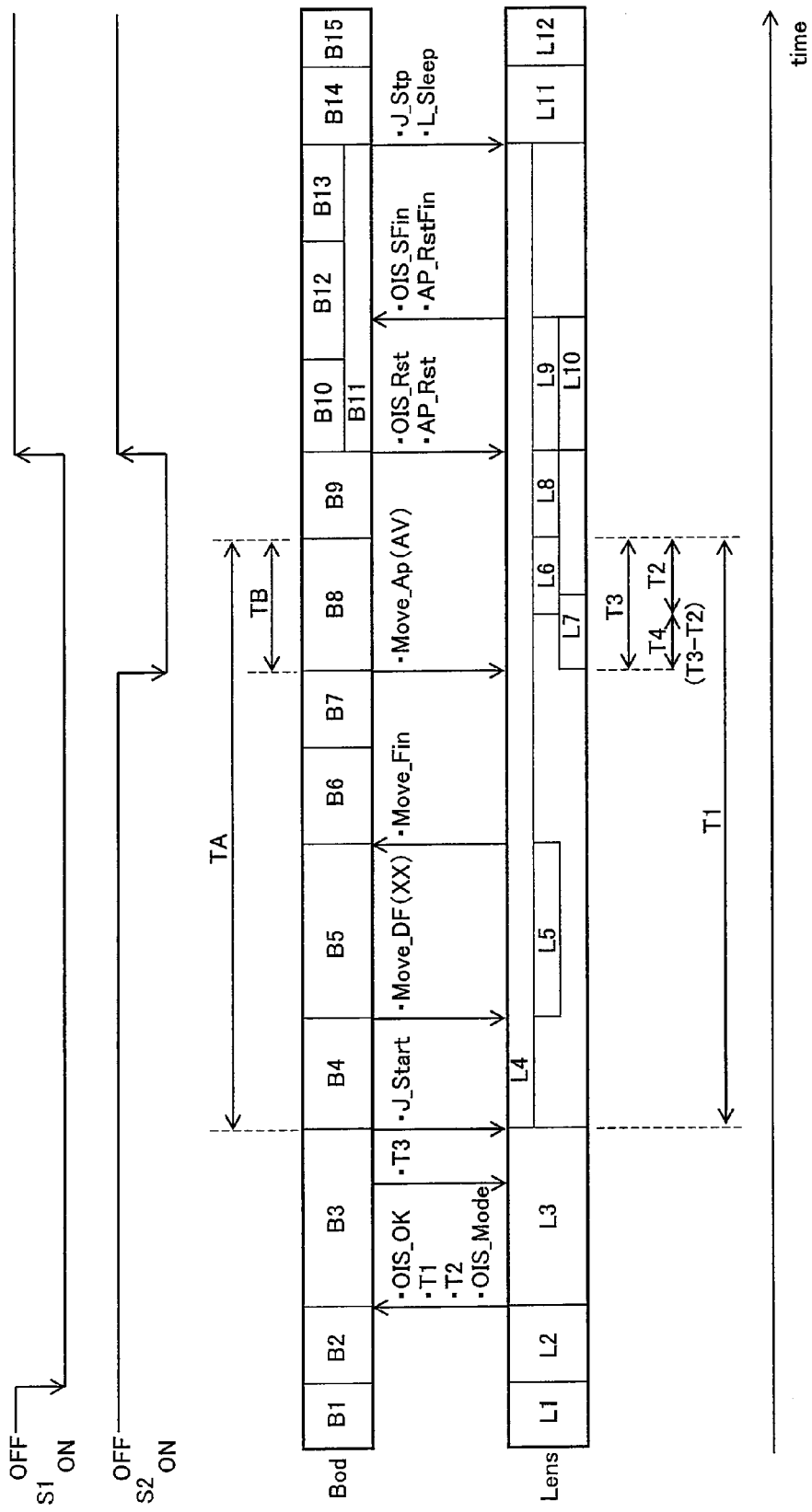
FIG. 4 is a time chart A in the first embodiment of the present invention.
Figure 5B:
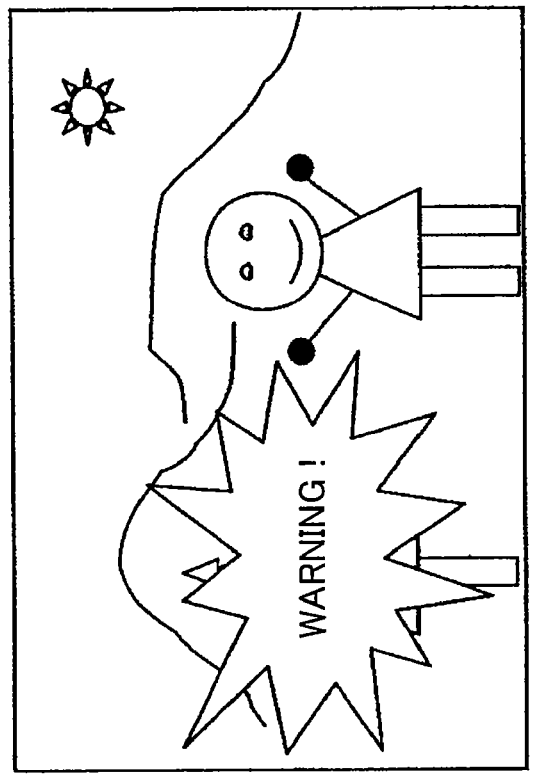
FIG. 5B is a shake warning display, in an image display in the first embodiment of the present invention.
Figure 5A:
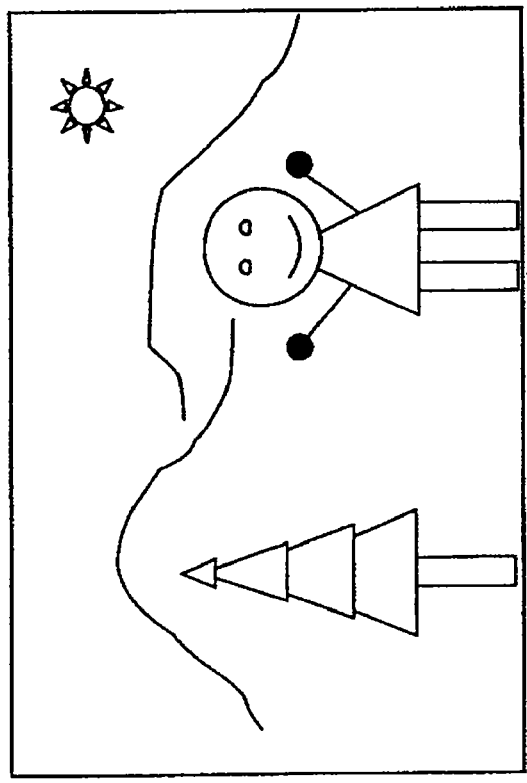
FIG. 5A is an example of a normal display.
Figure 6:
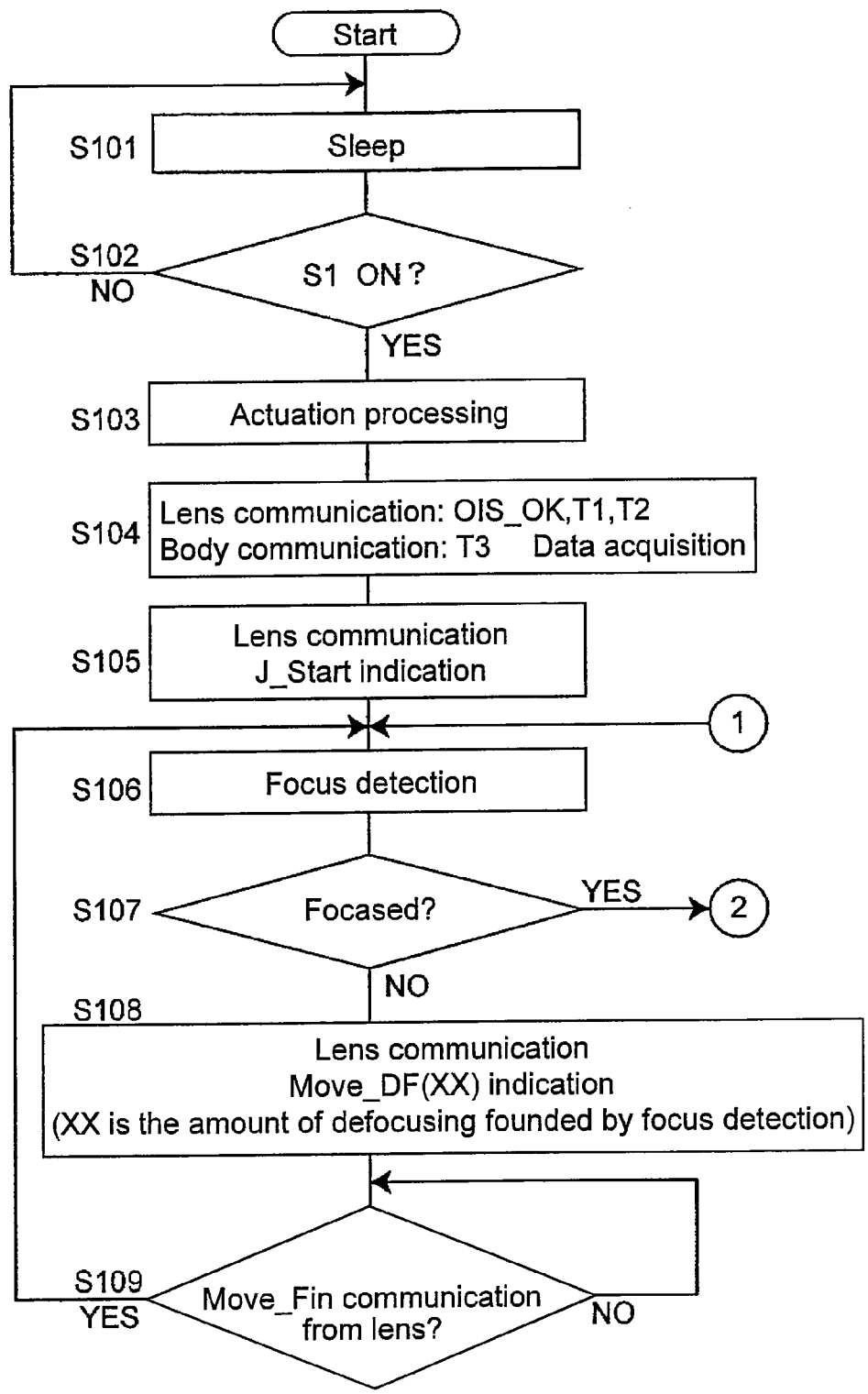
FIG. 6 is a flowchart of the time chart A in the first embodiment of the present invention.
Figure 7:
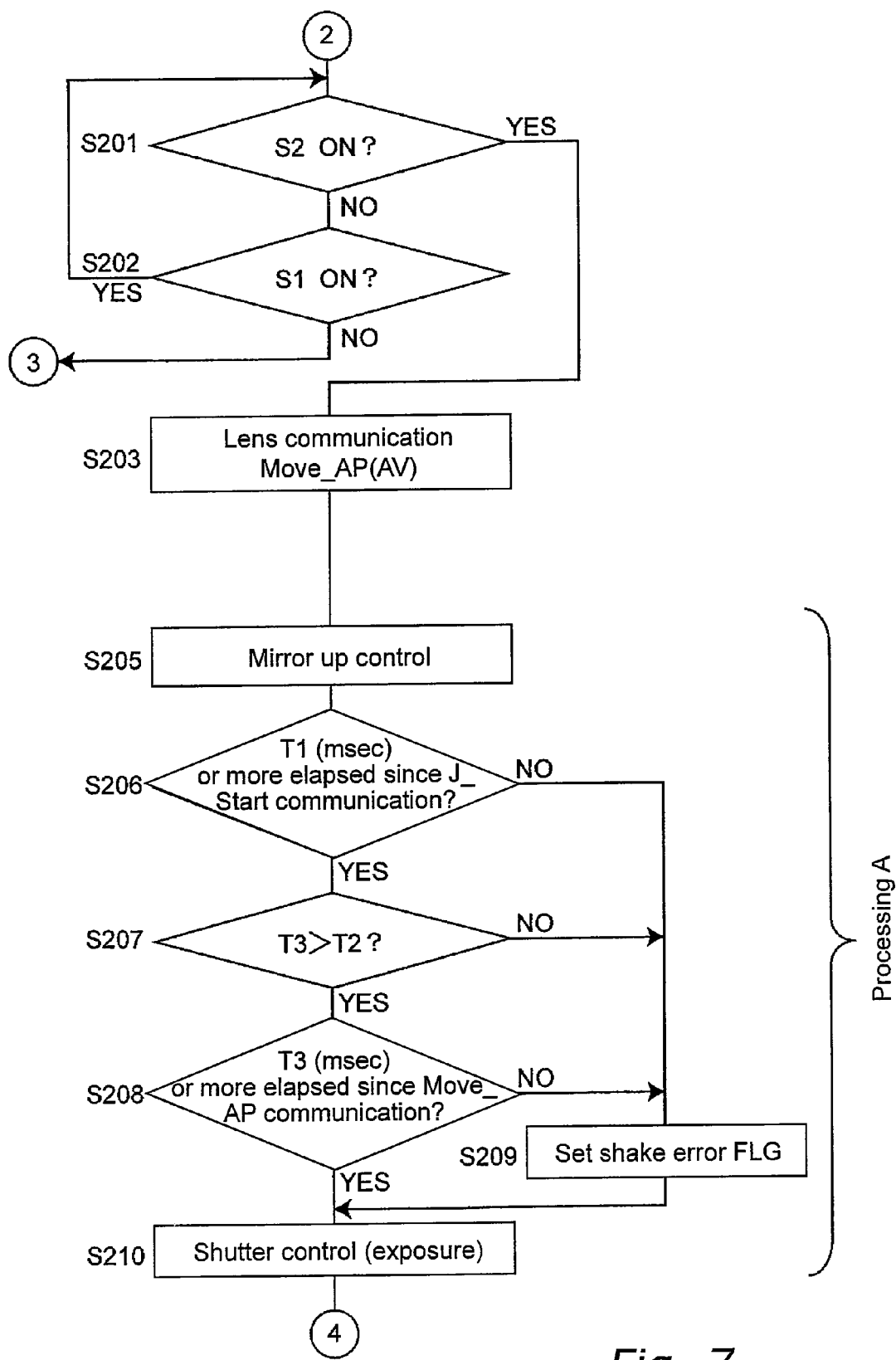
FIG. 7 is a flowchart of the time chart A in the first embodiment of the present invention.
Figure 8:
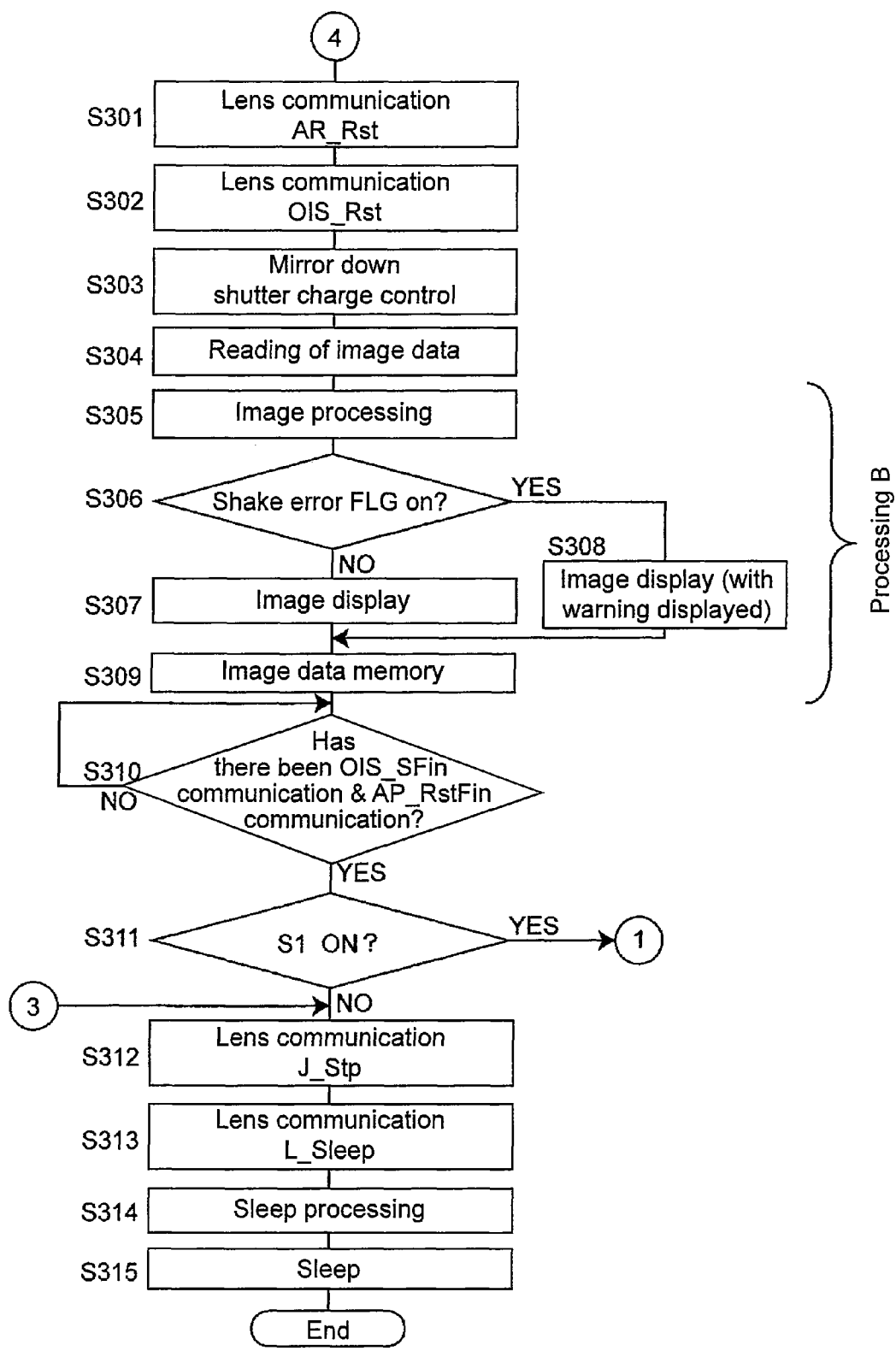
FIG. 8 is a flowchart of the time chart A in the first embodiment of the present invention.

Next, the communication details between the interchangeable lens 20 and the camera body 10, and the timing thereof, will be described with reference to FIGS. 4 to 7. FIG. 4 is a time chart A (a time chart of an imaging sequence of a type in which release timing has priority) as a first time chart applicable in an embodiment of the present invention. Table 1 gives a list of the data, commands, and communications used in the information transfer performed by the camera body 10 and the interchangeable lens 20 in relation to the image blur correction of the interchangeable lens 20 in this embodiment. FIGS. 6 to 8 are flowcharts of the time chart A. The time chart shown in FIG. 4 assumes a state in which MODE 2 (image blur correction is performed only during release) has been selected as the image blur correction mode. The phrase "release timing has priority" means that there is no time lag caused by waiting for exposure to begin together with other operations.

Actuation

When the release button is in its OFF state, the camera body 10 and the interchangeable lens 20 are in sleep states B1 and L1 (FIG. 4). The sequence microcomputer 100 and the lens microcomputer 200 wait in their sleep states for the first switch S1 to enter its ON state (steps S101 and S102 in FIG. 6). When the release button is pressed half-way down and the first switch S1 enters its ON state (Yes in step S102 in FIG. 6), the camera body 10 and the interchangeable lens 20 both undergo actuation processing B2 and L2 (step S103 in FIG. 6), and then the various kinds of information shown below are sent from the lens microcomputer 200 of the interchangeable lens 20 to the sequence microcomputer 100 of the camera body 10 (communications B3 and L3 in FIG. 4, and step S104 in FIG. 6).

"OIS_OK": Data indicating that an image blur correction function has been installed in the interchangeable lens 20

"T1": Information (detection stabilization time) related to the time it takes from the actuation of a shake detection sensor included in the shake detection unit 201 until the operation stabilizes "T2": Information (correction stabilization time, excitation drive time for image blur correction) related to the time it takes from the actuation of the image blur correction control unit 202 until image blur correction operation stabilizes "OIS_MODE": Information indicating the image blur correction mode (here, information indicating that MODE 2 has been selected)

In addition, body information shown below is sent from the sequence microcomputer 100 to the lens microcomputer 200 (communications B3 and L3 in FIG. 4, and step S104 in FIG. 6).

"T3": Time (exposure preparation time) necessary from the start of exposure preparation to the start of exposure in the camera body 10

T3 is used as one element in deciding the actuation timing of the image blur correction device 210 (discussed below).

Next, a command "J_Start" instructing the operation of the shake detection sensor is sent from the sequence microcomputer 100 to the lens microcomputer 200. Upon receiving the J_Start command, the lens microcomputer 200 operates the shake detection unit 201 (shake detection unit operation L4). The sequence microcomputer 100 starts a first time count ("TA" in FIG. 4) substantially simultaneously with the J_Start command of the previous stage.

TABLE 1

Data transmitted between camera body 10 and interchangeable lens 20

| Data name | Transmission direction Interchangeable lens: L Camera body: B | Description of information included in data |
|---|---|---|
| OIS_OK | L → B | Flag (FLG) indicating that lens has image blur correction function |
| T1 | L → B | Time until stabilization of shake detection sensor included in shake detection unit |
| T2 | L → B | Time required from drive of image blur correction until stabilization (time required for excitation drive for image blur correction) |
| T3 | B → L | Time (exposure preparation time) necessary from the start of exposure preparation to the start of exposure in the camera body 10 |
| OIS_Mode | L → B | Data indicating type of image blur correction mode (mode in which correction is performed constantly, or mode in which correction is performed only during release) |

Commands and communication transmitted between camera body 10 and interchangeable lens 20

| Name | Transmission direction | Description of information included in command or communication |
|---|---|---|
| J_Start | B → L | Command to start shake detection |
| Move_DF (XX) | B → L | Command to displace focus lens by defocus amount XX (mm) |
| Move_Fin | L → B | Communication indicating completion of displacement of focus lens by instructed defocus amount XX |
| Move_AP (AV) | B → L | Command to drive aperture unit 206 so that aperture value will be AV |
| OIS_Rst | B → L | Command to drive image blur correction lens unit 207 to reference position (center) |
| AP_Rst | B → L | Command to drive aperture unit 206 to release position |
| OIS_Sfin | L → B | Communication indicating that image blur correction lens unit 207 has returned to reference position (center), and reset completed |
| AP_RstFin | L → B | Communication indicating that drive to aperture to release position has been completed |
| J_Stp | B → L | Command to stop shake detection |
| L_Sleep | B → L | Command to put circuit included in interchangeable lens 20 in power conservation mode |

Focusing

In the camera body 10, focal point detection B4 for focusing is performed and the Df amount is acquired by the focal point detection unit 104 (step S106 in FIG. 6). The sequence microcomputer 100 determines whether or not the detected Df amount is within the focal range (step S107 in FIG. 6), and if the Df amount is over a specific permissible value (outside the focal range) (No in step S107 in FIG. 6), a focus drive command "Move_DF (XX)" is sent from the sequence microcomputer 100 to the lens microcomputer 200 on the basis of the calculated Df amount (step S108 in FIG. 6). Here, "XX" is a variable indicating the Df amount. Upon receiving this command, the lens microcomputer 200 sends the focus control unit 203 a command to drive the focusing lens 205 by the Df amount, and on the basis of this command the focus control unit 203 drives the focusing lens 205 by the Df amount (focus lens drive L5, state of waiting to halt focus lens drive B5).

Once the drive of the focusing lens 205 is complete, "Move_Fin" information is sent from the lens microcomputer 200 to the sequence microcomputer 100, and the sequence microcomputer 100 is notified of the completion of the drive of the focusing lens 205 (step S109 in FIG. 6). Once this communication is confirmed (Yes in step S109 in FIG. 6), the focal point detection operation is repeated (step S106 in FIG. 6). More specifically, after the sequence microcomputer 100 confirms the completion of lens drive, focal point detection B6 is performed again by the focal point detection unit 104, and a new Df amount is acquired (step S106 in FIG. 6). If the newly acquired Df amount is at or below a specific permissible value, it is determined to be within the focal range (focus F; Yes in step S107 in FIG. 6).

Exposure Preparation Operation

After this, the sequence microcomputer 100 confirms that the release button has been pushed all the way down, that is, the state of the second switch S2 (standby state B7; step S201 in FIG. 7). If the second switch S2 is in its OFF state (No in step S201 in FIG. 7), the sequence microcomputer 100 confirms the state of the first switch S1 (step S202 in FIG. 7). If the first switch S1 is in its OFF state (No in step S202 in FIG. 7), the sequence microcomputer 100 sends the lens microcomputer 200 an instruction to stop shake detection "J_Stp" (step S312 in FIG. 8), and a sleep state is entered (step S313). Also, the sequence microcomputer 100 performs sleep processing on the camera body 10 (step S314), and the camera body 10 enters its sleep state (step S315). This corresponds to a case in which the user stops pushing the release button, and is because there is the possibility that the imaging operation has been canceled.

Once the second switch S2 enters its ON state in step S201 in FIG. 7, simultaneously with this, an aperture drive command "Move_Ap (AV)" (a command to drive the aperture unit 206 so that the aperture value will be AV) as an adjustment command is sent from the sequence microcomputer 100 to the lens microcomputer 200 (steps S203 in FIG. 7).

Also, a second time count is started ("TB" in FIG. 4) in the sequence microcomputer 100 simultaneously with the output of the Move_Ap (AV) command. After this, a mirror up operation B8 is executed in the camera body 10 (step S205 in FIG. 7). More specifically, the main mirror 109 and the sub-mirror 108 are housed on the reticle 110 side by the mechanical control unit 103.

Meanwhile, upon receiving the Move_Ap (AV) command, the lens microcomputer 200 sends an instruction to the aperture drive unit 204 such that the aperture value will be AV, and the aperture unit 206 is subjected to control L7. The aperture drive unit 204 and the aperture unit 206 are designed so as to complete an update of the aperture value within a time shorter than the time it takes for mirror-up to be performed in the camera body 10.

In addition, the lens microcomputer 200 performs the computation of T4=T3−T2, based on the excitation drive time for image blur correction T2 and an exposure preparation time T3 sent in advance from the sequence microcomputer 100. After waiting for an excitation preparation time T4 (T3−T2) after the receipt of Move_AP (AV), the lens microcomputer 200 sends an actuation command to the image blur correction device 210. As a result, the image blur correction unit 202 and the image blur correction lens unit 207 are actuated, and the correction operation is performed (excitation drive for image blur correction L6). In particular, lens for image blur correction in the image blur correction lens unit 207 is kept in the reference position (center) electrically or mechanically before actuation. When the image blur correction device 210 is actuated, the image blur correction unit 202 starts controlling the operation of the image blur correction lens unit 207, according to the output from the shake detection unit 201.

Timing at which Image Blur Correction Device is Actuated

Figure 9A:
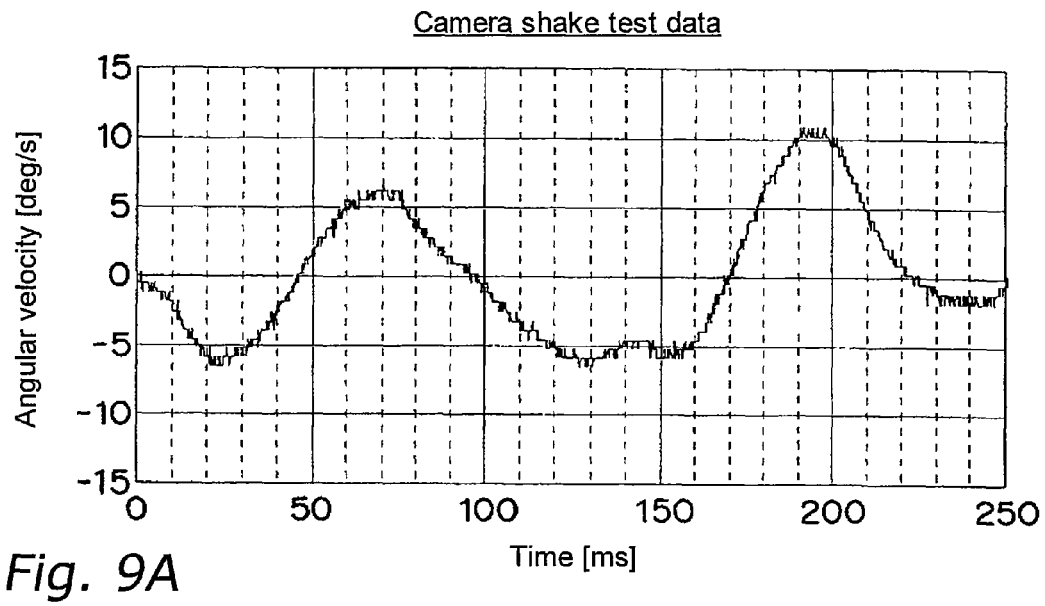
FIG. 9A is a graph showing the results of an experiment to detect shaking of a camera system caused by shaking of the hands.

The reason for driving the image blur correction device 210 after first waiting the excitation preparation time T4 will now be described through reference to FIGS. 9A and 9B. FIG. 9A is a graph illustrating data from an experiment to detect hand shake by a gyro sensor, and FIG. 9B is a graph illustrating the operation of the image blur correction device 210 in an embodiment of the present invention (and particularly its operation from its actuation until the operation stabilizes).

Figure 9B:
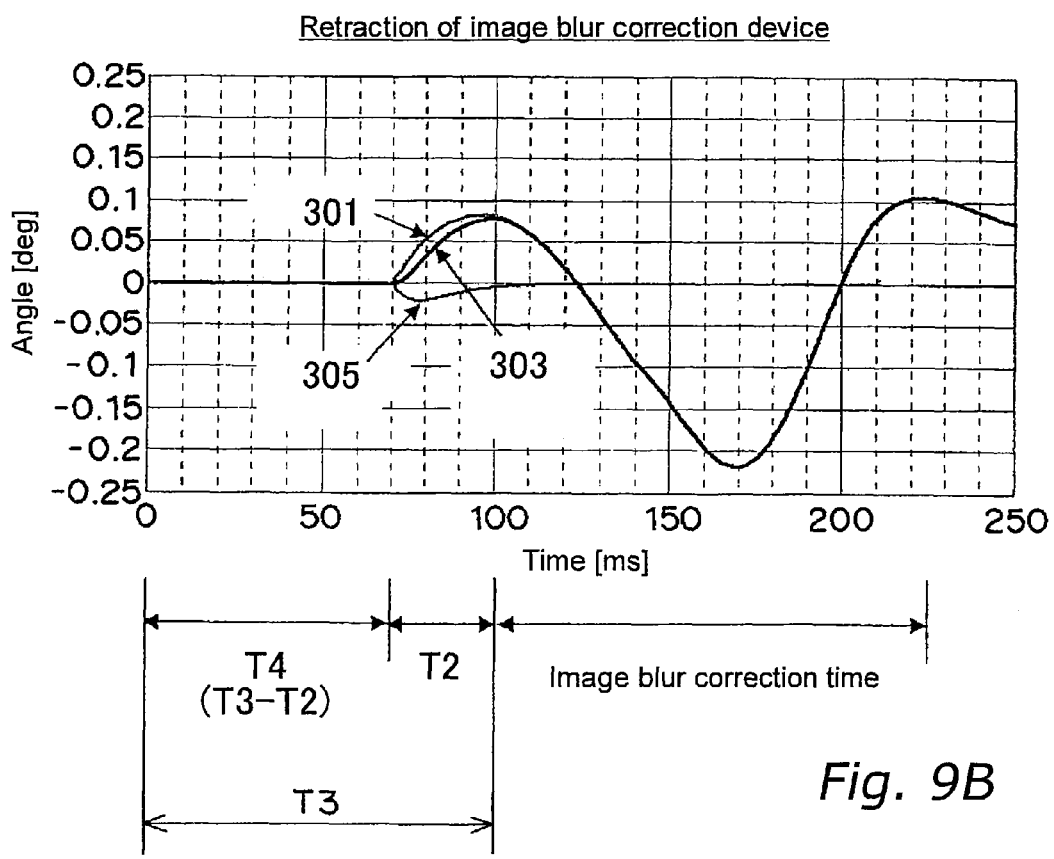
FIG. 9B is a graph showing the change over time in the correction error and the amount of correction of camera shake performed by an image blur correction device in an embodiment of the present invention.

The graph in FIG. 9B shows the various speeds detected by a gyro sensor (not shown) serving as the shake detection means attached to the camera body 10, or a gyro sensor included in the shake detection unit 201 of the interchangeable lens 20 in a state in which actually the camera shakes. This graph is a reference diagram provided as a typical example of an actual shake profile during imaging.

The graph in FIG. 9B was obtained by integrating the shake detected by the shake detection unit 201 of the lens microcomputer 200 in actual imaging (such as the shake shown in FIG. 9A) from the beginning of the excitation drive time for image blur correction T2. Also, the graph in FIG. 9B shows a plot 301 of the correction amount (angle) of the image blur correction command sent from the lens microcomputer 200 to the image blur correction unit 202, a plot 303 of the correction amount (angle) actually performed when the image blur correction lens unit 207 was driven according to this command, and a plot 305 of the correction error (angle) (the difference between the plot 301 of the command correction amount and the plot 303 of the actual correction amount). Here, the time zero on the graph is the point when the second switch S2 becomes ON. Also, the correction angle serving as the correction amount refers to the angle of the optical axis corrected by operation of the image blur correction lens unit 207.

As shown in FIG. 9B, during the excitation drive time for image blur correction T2 after the start of the correction operation, the correction amount 303 of the image blur correction lens unit 207 produces a lag due to the effect of the control system, such as the image blur correction unit 202, or the inertial moment of the image blur correction lens unit 207, with respect to the command correction amount 301. Consequently, for a while after the start of drive of the image blur correction lens unit 207 (the excitation drive time for image blur correction T2: a period of about 30 msec in FIG. 9B), the absolute amount of the correction error 305 becomes larger than in the subsequent period, and there is the possibility that the image blur correction lens unit 207 and the image blur correction unit 202 will not have an adequate image blur correction effect. Therefore, to obtain a stable image blur correction effect, the excitation drive time for image blur correction T2 must be ensured from the point of actuation of the image blur correction unit 202 and the image blur correction lens unit 207.

With this camera system 1, however, the settings are such that the image blur correction lens unit 207 starts its correction operation after an excitation preparation time T4 (T3−T2) has elapsed since the start of exposure preparation in the camera body 10. This excitation preparation time T4 is determined by the lens microcomputer 200 from the exposure preparation time T3 included in the body information held in the sequence microcomputer 100, and the excitation drive time for image blur correction T2 included in the lens information held in the lens microcomputer 200. More specifically, the excitation preparation time T4 is the waiting time of the image blur correction unit 202 and the image blur correction lens unit 207, and is found by subtracting the excitation drive time for image blur correction T2 from the exposure preparation time T3. Accordingly, with this camera system 1, after the excitation drive time for image blur correction T2 there is a transition to an image blur correction period (from the time of 100 msec and afterward in FIG. 9B) in which accurate image blur correction is performed substantially simultaneously with the start of exposure. As shown in FIG. 9B, accurate and stable image blur correction is possible during this period because the correction error 305 is sufficiently small (image blur correction L8).

Thus, with this camera system 1, the timing at which the image blur correction device 210 is actuated is determined by calculating backwards from the exposure preparation time T3 and the excitation drive time for image blur correction T2. This allows the image blur correction operation to be stabilized along with the start of exposure, affords a highly efficient and stable image blur correction effect, and makes it possible to minimize the negative effect of the image blur correction optical system on image quality and so forth.

In addition, in this camera system 1, as a command for determining the timing of actuating the image blur correction device 210, a general command other than an actuation command of the image blur correction device 210 like the aperture drive command is used. Therefore, a special command for actuating the image blur correction device 210 is not needed, and the simplification of the system can be accomplished.

Furthermore, during the excitation drive time for image blur correction T2, for example, the image blur correction lens unit 207 is micro-vibrated to improve conformity during start-up of the main image blur correction. As a result, stable image blur correction drive is performed from the point when the time T2 has elapsed since the start of drive of the image blur correction unit and thereafter.

In addition, if T3≦T2, that is, if T4≦0, the image blur correction device 210 is actuated simultaneously with the receipt of the aperture drive command "Move_Ap (AV)". At this time, if T4=0, the image blur correction operation will stabilize simultaneously with the start of exposure. However, if T4<0, the timing at which the image blur correction operation stabilizes will be delayed from the start of exposure by the time (T2−T3).

Exposure Operation

The sequence microcomputer 100 of the camera body 10, at the point of mirror-up completion, confirms that the time TA (the time obtained by the above-mentioned first time count) since the communication J_Start was sent to the interchangeable lens 20 is longer than the time T1 until the shake detection sensor of the shake detection unit 201 stabilizes, and that the time TB (the time obtained by the above-mentioned second time count) since the command Move_OIS (T3) was sent to the interchangeable lens 20 is longer than the time T3 indicated at the start of image blur correction. That is, it is confirmed that TA>T1 and TB>T3 (steps S206 and S208 in FIG. 7). If either of these should be shorter, an image blur correction error flag is set up (step S209 in FIG. 7). If an image blur correction error flag has been set up, a warning display is preferably performed during the subsequent after-view display.

Next, upon completion of the mirror up operation B8, that is, after the exposure preparation time T3 has elapsed since the start of the mirror up operation B8, the shutter 107 is driven by the mechanical control unit 103, and the imaging sensor 106 is exposed for a time corresponding to the shutter speed (exposure operation B9, step S210 in FIG. 7).

Resetting Operation

Upon completion of exposure, a command "AP_Rst" to drive the aperture unit 206 and reset it to its open position, and a command "OIS_Rst" to reset the image blur correction lens unit 207 to its reference position (center) are sent from the sequence microcomputer 100 to the lens microcomputer 200 (steps S301 and S302 in FIG. 8). As a result, the aperture unit 206 and the image blur correction lens unit 207 are driven to be reset in the interchangeable lens 20 (precentering L9, aperture opening drive L10). Upon completion of reset drive, the lens microcomputer 200 sends communications "OIS_SFin" and "AP_RstFin" indicating that completion to the sequence microcomputer 100.

After the exposure is finished, mirror down control and resetting of the shutter to its initial position (shutter charging) are performed in the camera body 10 (mirror down and shutter charging B11, step S303 in FIG. 8). At the same time, image data is read by the imaging sensor drive unit 113 from the imaging sensor 106 (image data read-out B10, step S304 in FIG. 8), and the data that has been read is subjected by the digital processing microcomputer 101 to specific image processing B12 (step S305 in FIG. 8). The captured image that has undergone this processing is displayed by the image display liquid crystal unit 105 on the back of the camera, and held in the external memory 102 (image display and data memory B13)

Warning Operation

In the display of the captured image on the image display liquid crystal unit 105, the status of the image blur correction error flag is checked by the sequence microcomputer 100 (step S306 in FIG. 8). If the error flag is not set up, just the captured image is displayed (step S307 in FIG. 8). On the other hand, if the image blur correction unit error flag is set up (if it is ON), a command is sent from the sequence microcomputer 100 to the digital processing microcomputer 101 to display the image with an attached warning (Yes in step S306 in FIG. 8). As a result, as shown in FIG. 5b, a captured image with an attached warning is displayed on the image display liquid crystal unit 105 (step S308 in FIG. 8). After the display of the captured image, the image data is held in the external memory 102 (step S309 in FIG. 8).

Also, when "OIS_SFin" and "AP_RstFin" have been sent from the lens microcomputer 200, if the first switch S1 is in its ON state (Yes in step S311 in FIG. 8), then focal point detection is started again (step S106 in FIG. 6).

Sleep

Upon completion of the series of processing in the camera body 10 and of the resetting of the aperture and image blur correction in the interchangeable lens 20, if the first switch S1 is in its OFF state (No in step S311 in FIG. 8), then the sequence microcomputer 100 sends the lens microcomputer 200 a command to stop shake detection "J_Stp" (step S312 in FIG. 8), and the lens microcomputer 200 performs sleep processing L11 on the interchangeable lens 20 (S314 in FIG. 8). Also, the sequence microcomputer 100 performs sleep processing B14 on the camera body 10 (step S314 in FIG. 8). As a result, the camera body 10 and the interchangeable lens 20 enter their sleep state B15 and L12 (step S315 in FIG. 8).

The term "sleep" here means that the various constituent components, including the microcomputer components, are in a power conservation mode. If the first switch S1 is in its ON state, the above-mentioned sequence is repeated from focal point detection (issuance of the J_Start command) (step S102 in FIG. 6).

3: Advantages

With this camera system 1, the timing at which the image blur correction device 210 is actuated is determined by calculating backwards from the exposure preparation time T3 and the excitation drive time for image blur correction T2. This allows the correction operation of the image blur correction device 210 to be stabilized along with the start of exposure, affords a highly efficient and stable image blur correction effect, and makes it possible to minimize the negative effect of the image blur correction optical system on image quality and so forth.

In addition, in this camera system 1, as a command for determining the timing of actuating the image blur correction device 210, a command (general command) other than an actuation command (special command) for the image blur correction device 210 like the aperture drive command is used. Therefore, a special command for actuating the image blur correction device 210 is not needed, and it is possible to simplify the system.

Furthermore, in this camera system 1, a warning display is performed if exposure started in a state that the correction operation of the image blur correction device 210 is not stable. In other words, a user can ascertain whether or not an adequate image blur correction effect has been obtained. Therefore, a user can check the images and retake the images if necessary, and a user can be highly satisfied with the photographs.

Second Embodiment

Next, a second embodiment of the present invention will be described while referring to the attached drawings. In addition, the general configuration of the imaging device according to the second embodiment is the same as the imaging device that was described previously. Therefore, the differences between the two will be mainly described below, and descriptions on the common configuration will be omitted. The time chart B shown in FIG. 10 is also the same as the time chart A that was described above, and the state that MODE 2

(in which image blur correction is performed only during release) as the image blur correction mode is selected will be assumed.

In the above described first embodiment, the excitation preparation time T4 is determined based on the exposure preparation time T3 and the excitation drive time for image blur correction T2. However, a predicted preparation time T4' that corresponds to the excitation preparation time T4 may be stored in advance in the lens microcomputer 200. The predicted preparation time T4' is a time that is predicted from data such as the exposure preparation time T3 and the excitation drive time for image blur correction T2.

Figure 10:
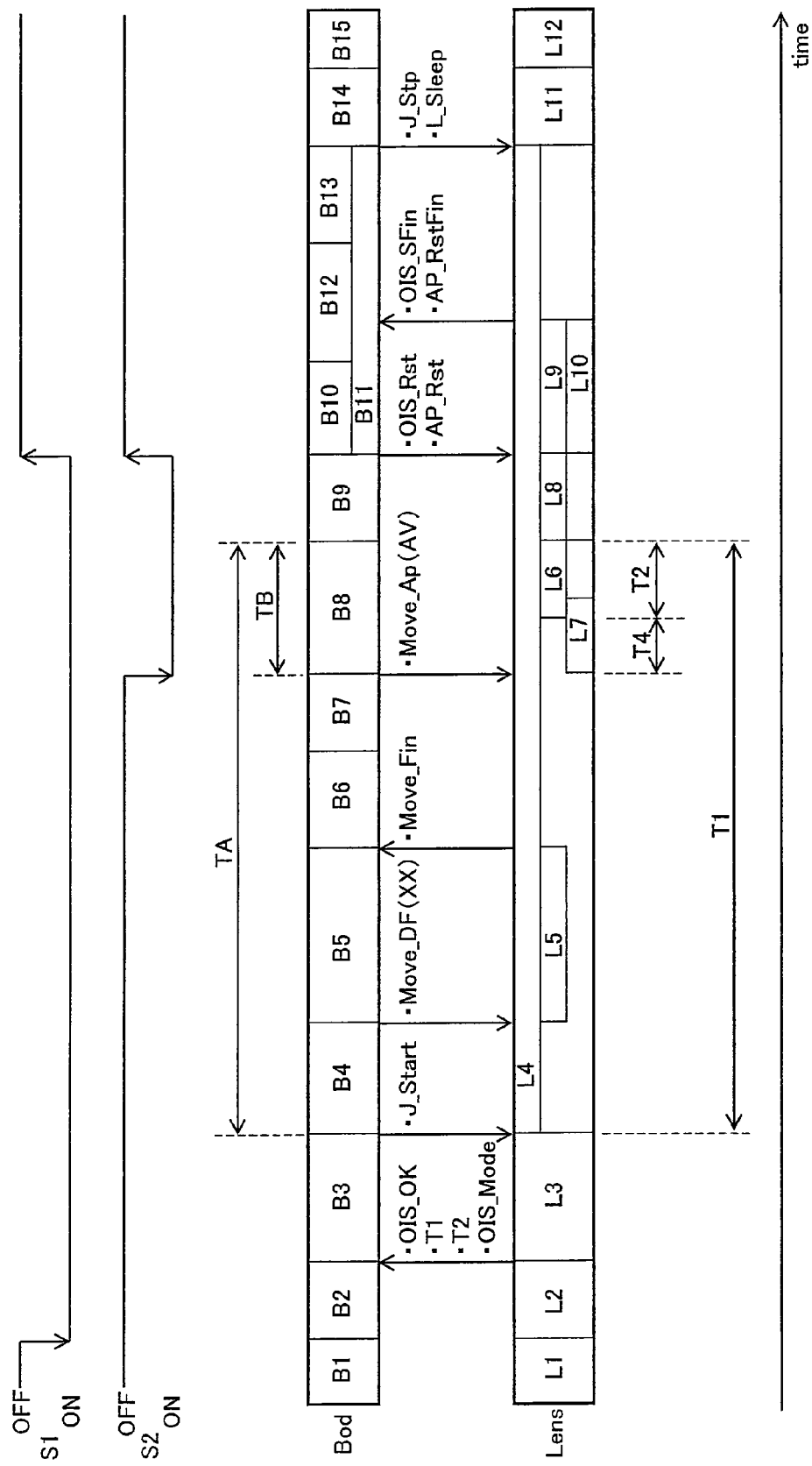
FIG. 10 is a time chart B in a second embodiment of the present invention.

In this case, as shown in FIG. 10, after the predicted preparation time T4' is passed after the receipt of the Move_Ap (AV) command, the lens microcomputer 200 actuates the image blur correction device 210. As a result, a highly efficient and stable image blur correction effect can be obtained with the camera system 1 according to the present embodiment, same as the camera system 1 according to the above described first embodiment.

In addition, in this case, it is not necessary to send the exposure preparation time T3 in advance to the lens microcomputer 200. Therefore, also in the case that it is not assumed that the camera body 10 sends the exposure preparation time T3 to the interchangeable lens 20 side, it is possible to obtain the same effects as the camera system 1 according to the above described first embodiment. Therefore, with the camera system 1 according to the present embodiment, it is possible to further simplify the system.

The camera system 1 according to this embodiment is especially effective in the case that the exposure preparation time T3 practically does not change due to the model of the camera body 10.

Third Embodiment

Figure 11:
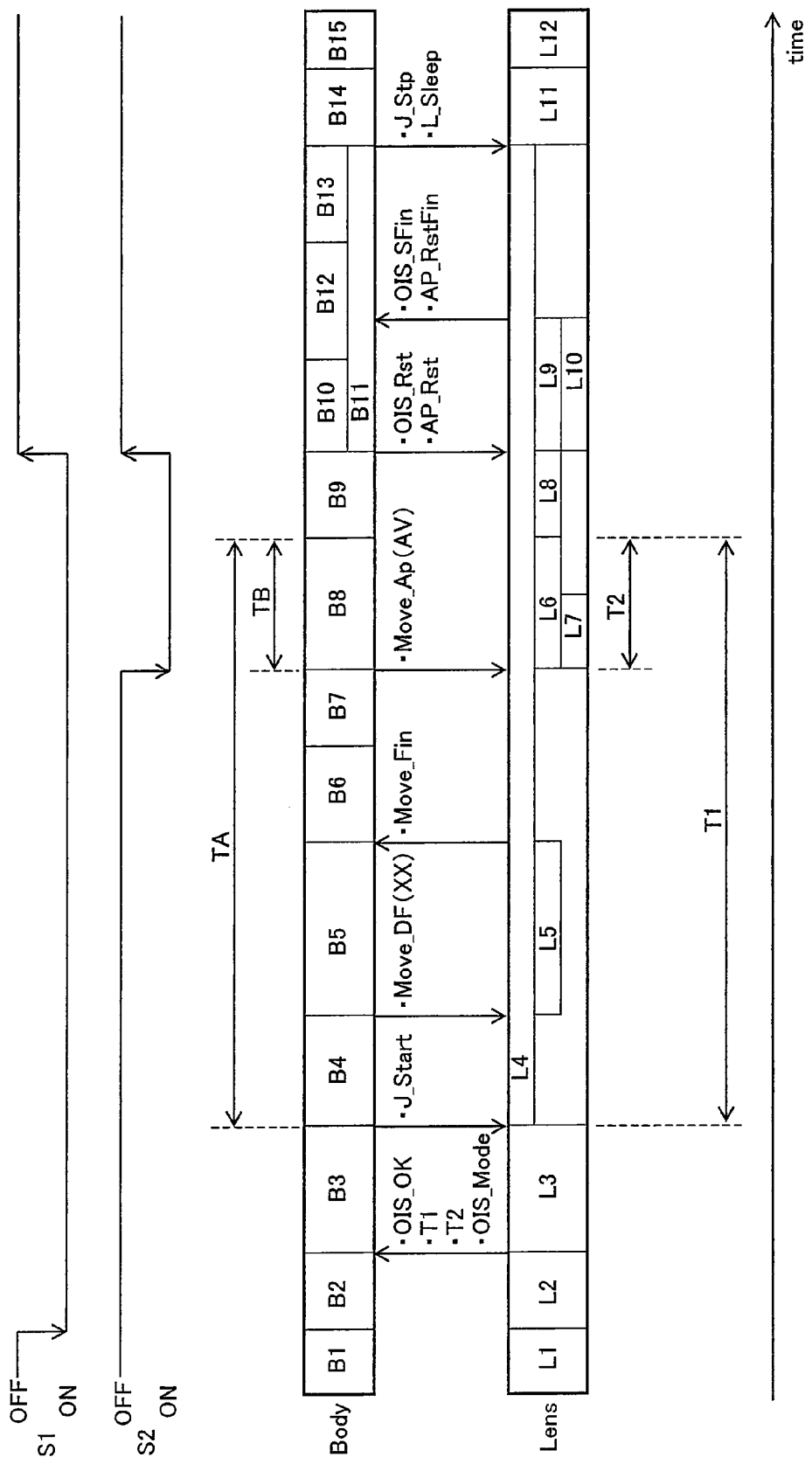
FIG. 11 is a time chart C in a third embodiment of the present invention.

In the above described embodiment, the excitation preparation time T4 is computed or set in advance. However, the timing at which the image blur correction device 210 is actuated may be determined without using the exposure preparation time T3 and the excitation preparation time T4. In this case, as shown in FIG. 11, the lens microcomputer 200 actuates the image blur correction device 210 at the same time when the Move_Ap (AV) command is received. In other words, the image blur correction device 210 is actuated simultaneously with the start of exposure preparation of the camera body 10. As a result, a highly efficient and stable image blur correction effect can be obtained with the camera system 1 according to the present embodiment, same as the camera system 1 according to the above described first embodiment.

In addition, in this case, it is not necessary to send the exposure preparation time T3 in advance to the lens microcomputer 200 or set the excitation preparation time T4 in advance. Therefore, it is possible to further simplify the system with the camera system 1 according to the present embodiment.

In addition, the camera system 1 according to this embodiment is especially effective in the case that the excitation preparation time T4 is small to the degree that it can be ignored (in the case that the exposure preparation time T3 and the excitation drive time for image blur correction T2 are nearly the same).

Fourth Embodiment

In the above described embodiment, the timing at which the image blur correction device 210 is actuated is determined using the aperture drive command Move_Ap (AV). However, the embodiment of the present invention is not limited to this. For example, the aperture drive command Move_Ap (AV) does not exist, in the case that the aperture adjustment is set manually or in the case that an aperture adjustment mechanism is not equipped. In this case, it is possible to use the focus drive command.

Figure 13:
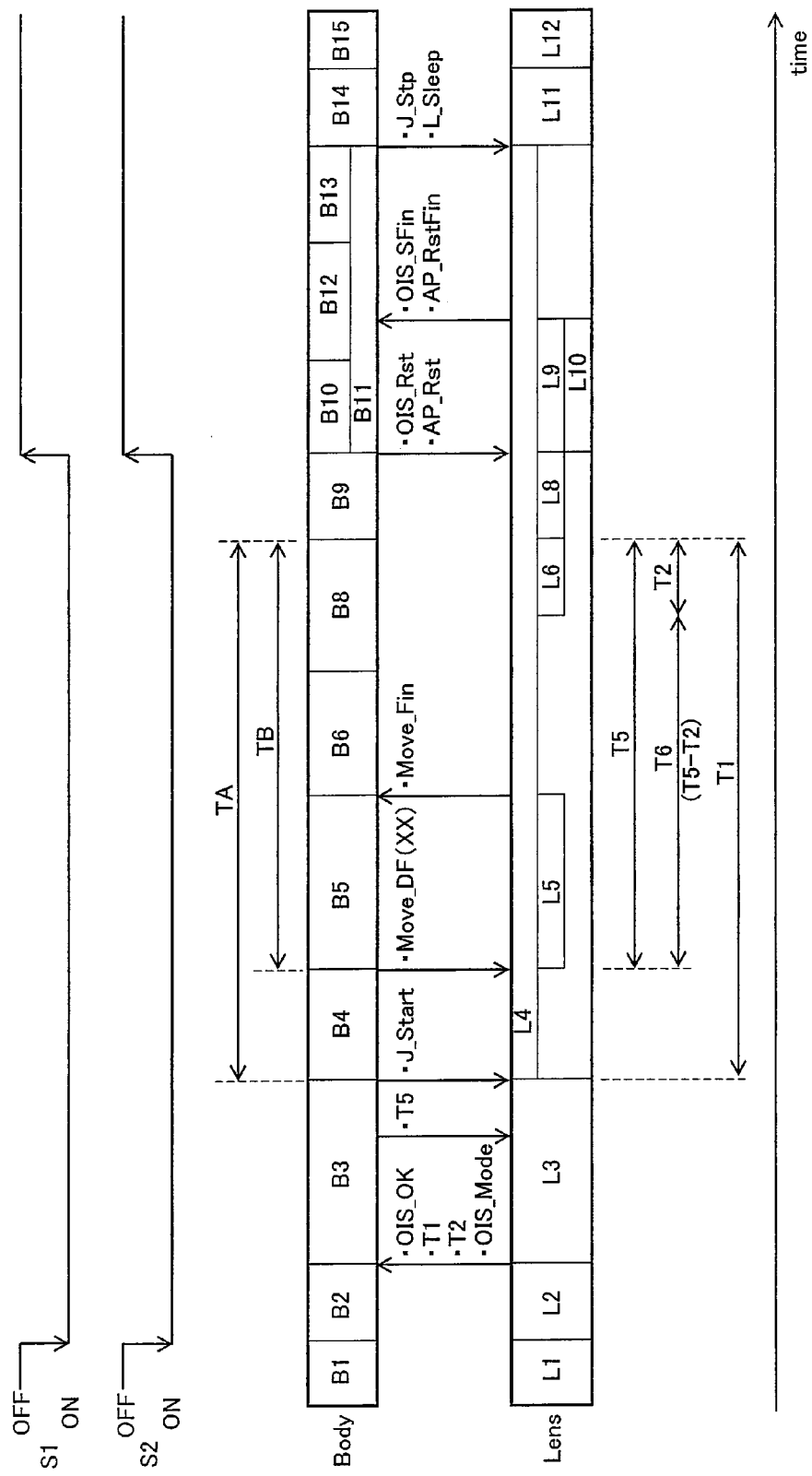
FIG. 13 is a time chart D in a fourth embodiment of the present invention.

For example, as shown in FIG. 13, in the case that the second switch S2 is ON at the same time when the first switch S1 is ON (if the release button is pushed all the way down at once), if it is judged that the focus adjustment is completed and that it is focused, a mirror up operation B8 is started following the focus adjustment L5 and the focus detection B6. At this time, for example, if priority is given to release timing, it is set such that the focus adjustment L5 is performed for a focus adjustment time that is set in advance in spite of the Df amount, so that the shutter chance is not missed. Meanwhile, a time that is necessary for the focus detection B6 and the mirror up operation B8 is set in advance to a constant time in the sequence microcomputer 100, since it practically does not change with each shot. In other words, by making the focus adjustment time constant, it is possible to make the preparation time T5 from after the focus drive command Move_Ap (AV) is sent until the exposure preparation is completed constant. In this case, it is possible to use the focus drive command Move_DF (XX), and determine the timing at which the image blur correction device 210 is actuated.

As shown in FIG. 13, the preparation time T5 is sent from the sequence microcomputer 100 to the lens microcomputer 200 at communications B3 and L3. The time T6 (=T5−T2) is computed by the lens microcomputer 200 based on the preparation time T5 and the excitation drive time for image blur correction T2.

In this case, when the lens microcomputer 200 receives the focus drive command Move_DF (XX) from the sequence microcomputer 100, a focus adjustment operation is started at the focus control unit 203. After a time T6 is passed from the receipt of the focus drive command Move_DF (XX), the image blur correction device 210 is actuated by the lens microcomputer 200, and the correction operation of the image blur correction device 210 is started.

In other words, in this camera system 1, the standard command is replaced from the aperture drive command Move_Ap (AV) to the focus drive command Move_DF (XX), and the standard time is replaced from the exposure preparation time T3 to the time T5, with respect to the camera system 1 according to the above described first embodiment. As a result, in the camera system 1, the correction operation of the image blur correction device 210 can be stabilized simultaneously with, or just prior to, when the focus adjustment and the focus detection are ended and the exposure preparation is complete.

In addition, in the above described first to third embodiments, the desired effect can be obtained if time T3≧time T2. However, if time T3<time T2, the timing at which the image blur correction device 210 is actuated will be delayed, and the desired image blur correction effect may be difficult to obtain. However, with the camera system 1 according to the present embodiment, since the relationship time T5>time T3 is established, the desired image blur correction effect can be easily obtained even if the time T2 is longer than the time T3.

Furthermore, since the timing at which the image blur correction device 210 is actuated is determined based on a command other than an actuation command of the image blur correction device 210, an actuation command for the image blur correction device 210 is not needed, and it is possible to simplify the system.

Figure 12:
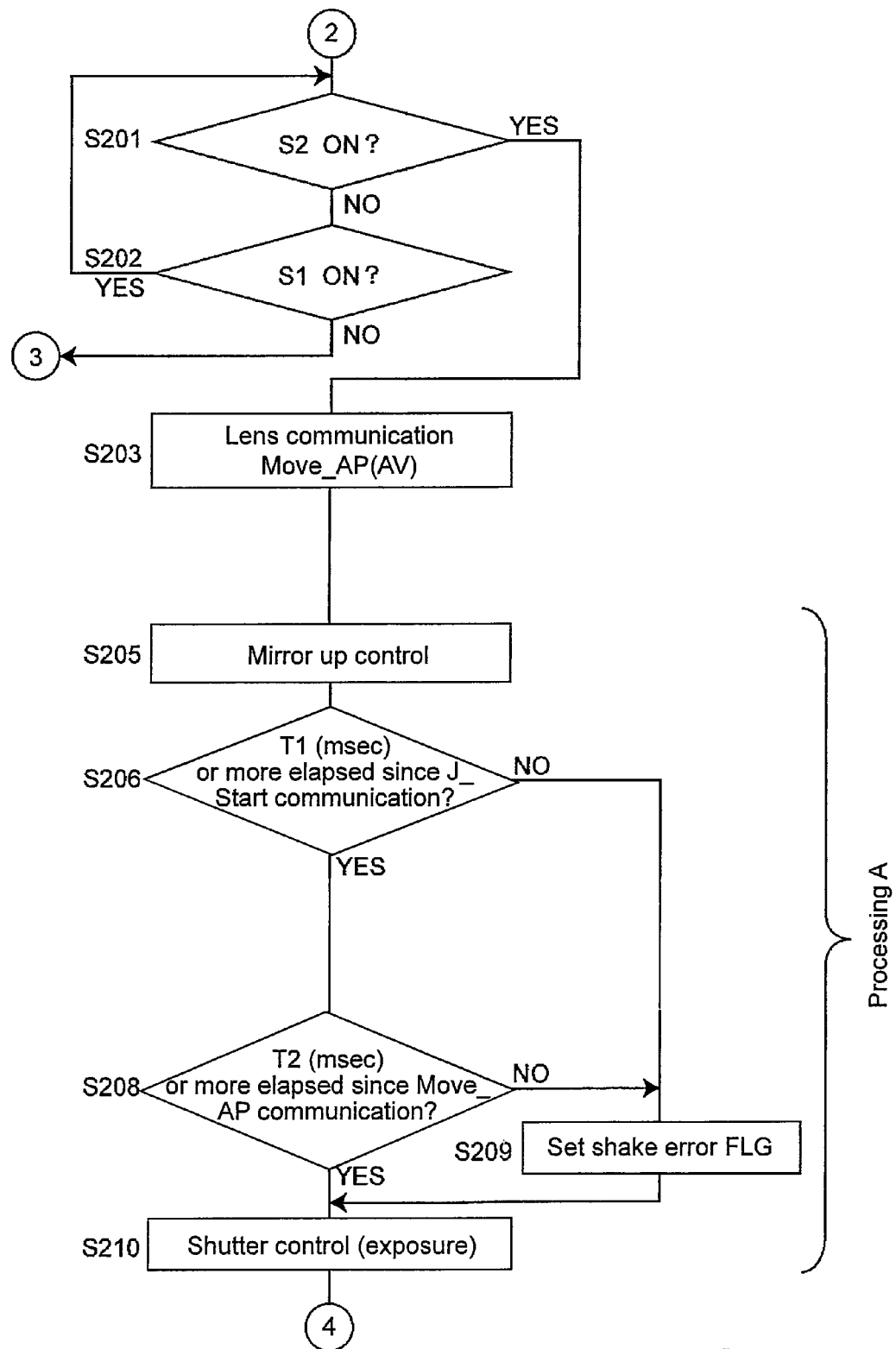
FIG. 12 is part of a flowchart of the time chart C in the third embodiment of the present invention.

In addition, in this case, as shown in the flowchart in FIG. 12 (the flowchart corresponding to FIG. 7 of the first embodiment), the time TB for the above described error flag is compared with the preparation time T5. If the preparation time T5>TB (No in step S208 in FIG. 12, if T2 or longer is not passed from the Move_Ap (AV) communication), the error flag is set. And, a warning is displayed during the after-view. As a result, the user can capture an image which is satisfactory.

In addition, in this case, since the focus adjustment time is limited to a constant time, even in the state where it is not completely focused, the exposure operation B9 is forced to start. Therefore, the focus detection B6 can be omitted.

Fifth Embodiment

In the above described fourth embodiment, the timing at which the image blur correction device 210 is actuated is determined based on the focus drive command Move_DF (XX) and the time T5. However, the embodiment of the present invention is not limited to this. Other than the focus drive command, it is also possible that a zoom drive command is used.

Figure 14:
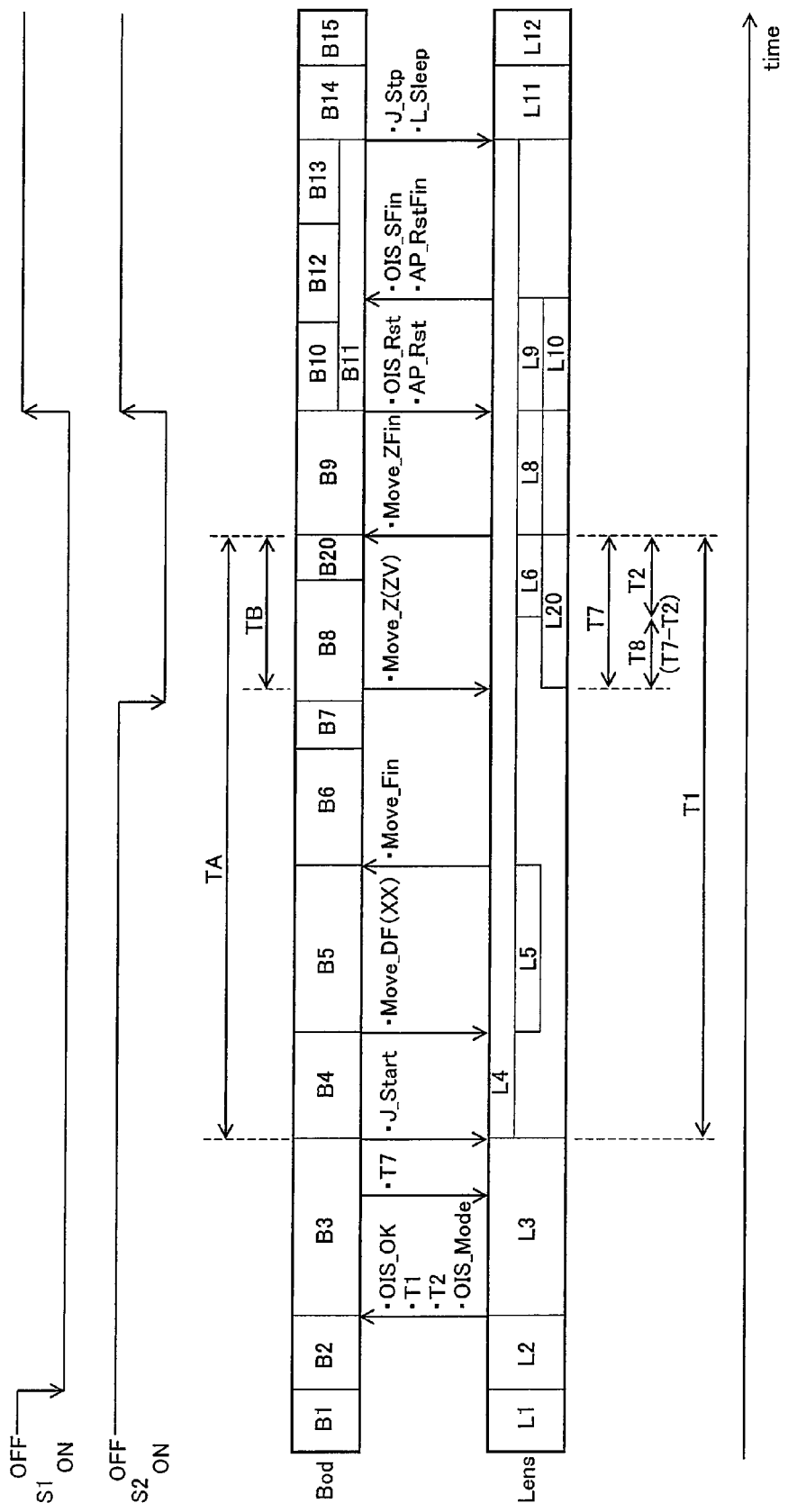
FIG. 14 is a time chart E in the fourth embodiment of the present invention.

In this case, as shown in FIG. 14, the standard command is the zoom drive command Move_Z (ZV) (a command to adjust the state of the zoom to become the operating value ZV), and the standard time is a zoom adjustment time T7. The zoom adjustment time T7 is the operating time of a zoom adjustment unit (not shown) under a certain condition, and it is set in advance in the sequence microcomputer 100.

For example, in the standby state B7 after a focused state is judged, after the release button is pushed all the way down, a zoom operation unit (not shown) arranged on the camera body 10 side is operated by the user. As a result, sometimes the zoom adjustment unit will still continue to operate at the time that the mirror up operation B8 is terminated. In this case, it is highly possible that a shutter chance will be missed. Therefore, this is prevented by limiting the time that the adjustment operation of the zoom adjustment unit is performed to a time that is fixed.

More specifically, the zoom adjustment time T7 is sent from the sequence microcomputer 100 to the lens microcomputer 200 in advance. A time T8 (=T7−T2) is computed in the lens microcomputer 200, based on the zoom adjustment time T7 and the excitation drive time for image blur correction T2.

When the zoom drive command Move_Z (ZV) is sent from the sequence microcomputer 100 to the lens microcomputer 200, an adjustment operation L20 of the zoom adjustment unit is performed for the zoom adjustment time T7. After the adjustment operation L20 is ended, the exposure operation B9 is started. After the time T8 passed after receiving the zoom drive command Move_Z (ZV), the image blur correction device 210 is actuated, and the correction operation of the image blur correction device 210 is started.

Meanwhile, in the camera body 10, the mirror up operation B8 is started simultaneously when the button is pushed all the way down. When the mirror up operation B8 ends, the sequence microcomputer 100 waits for a zoom adjustment completion signal Move_ZFin from the lens microcomputer 200 (standby state B20 in FIG. 14). When the sequence microcomputer 100 receives the zoom adjustment completion signal Move_ZFin, the exposure operation B9 is started. The correction operation of the image blur correction device 210 stabilizes almost simultaneously with the start of the exposure operation B9.

In other words, in this camera system 1, the standard command is replaced from the focus drive command Move_DF (XX) to the zoom drive command Move_Z (ZV), and the standard time is replaced from time T5 to the zoom adjustment time T7, with respect to the camera system 1 according to the above described fourth embodiment. As a result, in the camera system 1, around the timing at which exposure is started, it is possible to stabilize the correction operation of the image blur correction device 210, and the effects and advantages same as the above described embodiment can be obtained.

In addition, since the timing at which the image blur correction device 210 is actuated is determined based on a command other than an actuation command of the image blur correction device 210, an actuation command for the image blur correction device 210 is not needed, and it is possible to simplify the system.

In addition, in this case, the time TB for the above described error flag is compared with the zoom adjustment time T7. If the zoom adjustment time T7>TB, the error flag is set. And, a warning is displayed during after-view. As a result, the user can capture an image that is satisfactory.

Other Embodiments

The specific constitution of the present invention is not limited to the embodiments given above, and various modifications and revisions are possible without departing from the gist of the invention.

(1)

The first to the fifth embodiments were each described as a separate embodiment. However, it is also possible to implement an embodiment combining the first to the fifth embodiments in various patterns.

(2)

The embodiments given above were premised on the excitation drive time T2 for image blur correction being constant. However, the excitation drive time T2 for image blur correction may vary with the state of the interchangeable lens 20 (for example, the zoom position, temperature, or humidity). In view of this, the sequence microcomputer 100 of the camera body 10 is preferably made up of such that data such as T2 with the potential to vary is updated at specific intervals or at a specific timing, not only at the time of actuation. When the camera body 10 is made up in this way, T2 may be updated after the Move_OIS (T3) communication is performed, so the relationship T3>T2 may not be satisfied. If this happens, some suitable processing may be performed, such as setting up an image blur error flag, to alert the user.

(3)

In the embodiments given above, the single-reflex camera system 1 composed of the camera body 10 and the interchangeable lens 20 was described as an example, but the present invention is not limited to being applied to a single-reflex camera system. The present invention can be applied to any camera system having a camera body and an interchangeable lens that can be attached to and detached from this camera body.

(4)

How the camera body and the interchangeable lens exchange information is not limited to the methods described above. For instance, the communication method may be either serial or parallel communication, or may be a communication method based on a standard, or a multipurpose communication method, or a dedicated communication method developed independently.

INDUSTRIAL APPLICABILITY

The present invention is favorable for a camera system in which an interchangeable lens can be attached to or detached from a camera body, typified by a digital single-reflex camera.

The invention claimed is:

1. A camera system for imaging a subject, comprising:
a camera body having an imaging unit for imaging the subject, and a body control unit for controlling the operation of the imaging unit; and
an interchangeable lens being attachable to and detachable from the camera body, and including a shake detection unit for detecting shake in the camera system, an image blur correction unit for adjusting the optical path from the subject to the camera body and thereby correcting the blurring of an image caused by shaking of the camera system, a lens control unit for controlling the drive of the image blur correction unit according to the amount of shake detected by the shake detection unit, and an imaging optical system for conducting the optical image of the subject to the imaging unit,
wherein the body control unit can send and receive information to and from the lens control unit,
the imaging optical system includes a condition adjustment unit which can adjust an imaging condition,
the lens control unit starts an adjustment operation in the condition adjustment unit based on an adjustment command sent from the body control unit for adjusting the imaging condition, and actuates the image blur correction unit once a first set time has elapsed since the receipt of the adjustment command,
the body control unit sends a required exposure preparation time from a start of an exposure preparation until the completion thereof in the camera body to the lens control unit, prior to sending the adjustment command, and
the lens control unit determines the first set time based on the required exposure preparation time and a required correction stabilization time from the actuation of the image blur correction unit until a predetermined image blur correction effect is obtained.

2. The camera system according to claim 1,
wherein the condition adjustment unit includes an aperture adjustment unit which can adjust an aperture in the imaging optical system,
the body control unit sends the adjustment command almost simultaneously with the start of the required exposure preparation time, and
the lens control unit starts an adjustment operation in the aperture adjustment unit based on the adjustment command.

3. The camera system according to claim 2, wherein the first set time is set in advance in the lens control unit.

4. The camera system according to claim 3,
wherein the first set time is zero, and
the lens control unit actuates the image blur correction unit almost simultaneously with the time which the adjustment operation is started in the aperture adjustment unit, based on the adjustment command.

5. The camera system according to claim 1,
wherein the condition adjustment unit includes a focus adjustment unit which can adjust the focus position of the imaging optical system, and
the lens control unit starts an adjustment operation in the focus adjustment unit based on the adjustment command.

6. The camera system according to claim 5,
wherein the body control unit sends a second set time from the start of the adjustment operation of the condition adjustment unit until the completion of the exposure preparation to the lens control unit, prior to sending the adjustment command, and
the lens control unit determines the first set time based on the second set time and a required correction stabilization time from the actuation of the image blur correction unit until a predetermined image blur correction effect is obtained.

7. The camera system according to claim 6,
wherein the camera body further includes an information display unit for displaying information related to the camera body, and
the body control unit includes a time counting unit for performing a time count from the point when the adjustment command is sent to the lens control unit until the exposure of the imaging unit is begun, and a warning unit for displaying a warning on the information display unit if the time count in the time counting unit is shorter than the second set time.

8. The camera system according to claim 1,
wherein the camera body further includes an information display unit for displaying information related to the camera body, and
the body control unit includes a time counting unit for performing a time count from the point when the adjustment command is sent to the lens control unit until the exposure of the imaging unit is begun, and a warning unit for displaying a warning on the information display unit if the time count in the time counting unit is shorter than the required exposure preparation time.

9. An interchangeable lens which is used in a camera system for imaging a subject and is attachable to and detachable from a camera body including an imaging unit for imaging the subject and a body control unit for controlling the imaging operation of the imaging unit, the interchangeable lens comprising:
a shake detection unit for detecting shake in the camera system;
an image blur correction unit for adjusting the optical path from the subject to the camera body and thereby correcting the blurring of an image caused by shaking of the camera system;
a lens control unit for controlling the drive of the image blur correction unit according to the amount of shake detected by the shake detection unit; and
an imaging optical system for leading the optical image of the subject to the imaging unit;
wherein the lens control unit which can send and receive information to and from the body control unit,
the imaging optical system includes a condition adjustment unit which can adjust an imaging condition,
the lens control unit starts an adjustment operation in the condition adjustment unit based on an adjustment command sent from the body control unit for adjusting the imaging condition, and actuates the image blur correction unit once a first set time has elapsed since the receipt of the adjustment command,
the body control unit sends a required exposure preparation time from a start of an exposure preparation until the completion thereof in the camera body to the lens control unit, prior to sending the adjustment command, and
the lens control unit determines the first set time based on the required exposure preparation time and a required correction stabilization time from the actuation of the image blur correction unit until a predetermined image blur correction effect is obtained.

10. A method for controlling a camera system including a camera body having an imaging unit for imaging a subject and a body control unit for controlling the operation of the imaging unit, and an interchangeable lens which is attachable to and detachable from the camera body and has a shake detection unit for detecting shake in the camera system, an image blur correction unit for adjusting the optical path from the subject to the camera body and thereby correcting the blurring of an image caused by shaking of the camera system, a lens control unit for controlling the drive of the image blur correction unit according to the amount of shake detected by the shake detection unit, and an imaging optical system for leading the optical image of the subject to the imaging unit, the method comprising:

adjusting the imaging condition by a condition adjustment unit which can adjust the imaging condition of the imaging optical system, based on an adjustment command from the body control unit;

sending a required exposure preparation time from a start of an exposure preparation until the completion thereof in the camera body to the lens control unit, prior to sending the adjustment command;

determining a first set time based on the required exposure preparation time and a required correction stabilization time from the actuation of the image blur correction unit until a predetermined image blur correction effect is obtained; and actuating the image blur correction unit once the first set time has elapsed since the lens control unit received the adjustment command.

* * * * *